US012157129B2

(12) United States Patent
Soetaert et al.

(10) Patent No.: US 12,157,129 B2
(45) **Date of Patent: *Dec. 3, 2024**

(54) SHOWERHEAD

(71) Applicant: Kohler Co., Kohler, WI (US)

(72) Inventors: Michael J. Soetaert, Sheboygan, WI (US); James J. Barczynski, Kohler, WI (US); Paul B. Georgeson, Milwaukee, WI (US); Todd W. Leonhard, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,949

(22) Filed: Jan. 23, 2023

(65) Prior Publication Data

US 2023/0149954 A1 May 18, 2023

Related U.S. Application Data

(63) Continuation of application No. 16/547,265, filed on Aug. 21, 2019, now Pat. No. 11,577,260.

(60) Provisional application No. 62/721,332, filed on Aug. 22, 2018.

(51) Int. Cl.

| | |
|---|---|
| ***B05B 1/30*** | (2006.01) |
| ***B05B 1/02*** | (2006.01) |
| ***B05B 1/18*** | (2006.01) |

(52) U.S. Cl.

CPC .................. *B05B 1/30* (2013.01); *B05B 1/02* (2013.01); *B05B 1/18* (2013.01)

(58) Field of Classification Search

CPC .... B05B 1/02; B05B 1/18; B05B 1/26; B05B 1/262; B05B 1/265; B05B 1/30; B05B 15/62; B05B 15/652; B05B 15/654

USPC .................................................. 239/499, 504

See application file for complete search history.

(56) References Cited

U.S. PATENT DOCUMENTS

| | | | | |
|---|---|---|---|---|
| 1,745,297 | A | 1/1930 | Harry | |
| 1,836,505 | A | 12/1931 | Pritchard | |
| 2,639,947 | A * | 5/1953 | Tramm | B01D 3/008 261/111 |
| 2,874,001 | A | 2/1959 | Ross | |

(Continued)

FOREIGN PATENT DOCUMENTS

| | | | |
|---|---|---|---|
| CN | 101945708 | A | 1/2011 |
| CN | 104822462 | A | 8/2015 |

(Continued)

OTHER PUBLICATIONS

Darineey Shower Elbow Adapter for Shower Head 45 Angle, Dec. 7, 2020, amazon.com, Jun. 8, 2023, URL: https://www.amazon.ca/Darineey-Adapter-45%C2%B0Angle-Extender-Connector/dp/B08LSS5CLV/ (Year: 2020).

(Continued)

*Primary Examiner* — Darren W Gorman

(74) *Attorney, Agent, or Firm* — FOLEY & LARDNER LLP

(57) ABSTRACT

A showerhead includes a flow device and a flow distribution member. The flow device is configured to produce a substantially laminar fluid stream. The flow distribution member is coupled to the flow device and is spaced apart from the flow device. The flow distribution member is configured to receive the substantially laminar fluid stream from the flow device and to produce a distributed fluid flow.

14 Claims, 17 Drawing Sheets

(56) References Cited

U.S. PATENT DOCUMENTS

| | | | | |
|---|---|---|---|---|
| 2,915,252 | A * | 12/1959 | Umbricht | B05B 1/262 241/40 |
| 3,101,176 | A | 8/1963 | Goss | |
| 3,465,968 | A | 9/1969 | Halpern | |
| 4,072,397 | A | 2/1978 | Ross | |
| 6,557,785 | B1 | 5/2003 | Knapp | |
| D512,120 | S | 11/2005 | Haug et al. | |
| D532,076 | S | 11/2006 | Mazzola | |
| D540,424 | S | 4/2007 | Kirar | |
| D556,855 | S | 12/2007 | Mullenmeister et al. | |
| D581,013 | S | 11/2008 | Citterio | |
| D590,913 | S | 4/2009 | Smith et al. | |
| D613,370 | S | 4/2010 | Allard et al. | |
| D616,061 | S | 5/2010 | Whitaker et al. | |
| D639,385 | S | 6/2011 | Flowers et al. | |
| 8,333,331 | B1 | 12/2012 | Fuller et al. | |
| D681,781 | S | 5/2013 | Cutler et al. | |
| D694,357 | S | 11/2013 | Brodey et al. | |
| D707,328 | S | 6/2014 | Schoenherr et al. | |
| D733,257 | S | 6/2015 | Schoenherr et al. | |
| D736,348 | S | 8/2015 | Tan | |
| D738,991 | S | 9/2015 | Brodey et al. | |
| D751,176 | S | 3/2016 | Schoenherr et al. | |
| D752,708 | S | 3/2016 | Chung | |
| D779,042 | S | 2/2017 | Hanna et al. | |
| D790,039 | S | 6/2017 | Hawrylchak et al. | |
| D793,526 | S | 8/2017 | Behdjat | |
| D820,388 | S | 6/2018 | Seum et al. | |
| D851,207 | S | 6/2019 | Cocks et al. | |
| D867,521 | S | 11/2019 | Mahdjoubi Namin | |
| D888,195 | S | 6/2020 | Cocks et al. | |
| D890,298 | S | 7/2020 | Pixton | |
| D901,630 | S | 11/2020 | Wu | |
| D907,743 | S | 1/2021 | Wu | |
| D908,836 | S | 1/2021 | Wu | |
| D926,287 | S | 7/2021 | Cocks et al. | |
| D926,924 | S | 8/2021 | Cocks et al. | |
| D933,161 | S | 10/2021 | Kuppert et al. | |
| D933,777 | S | 10/2021 | Masalin et al. | |
| D934,990 | S | 11/2021 | Seum et al. | |
| D943,060 | S | 2/2022 | Fan | |
| D944,919 | S | 3/2022 | Yu et al. | |
| D950,013 | S | 4/2022 | Ravassa et al. | |
| 11,331,687 | B2 | 5/2022 | Yu et al. | |
| 11,351,558 | B2 | 6/2022 | Wang et al. | |
| 2004/0217209 | A1 | 11/2004 | Bui | |
| 2006/0226255 | A1 | 10/2006 | Deboer et al. | |
| 2011/0216526 | A1* | 9/2011 | Li | F21V 33/004 362/96 |
| 2011/0289675 | A1 | 12/2011 | Dunki-Jacobs et al. | |
| 2013/0219613 | A1* | 8/2013 | Ojea | B05B 1/26 4/615 |
| 2015/0115065 | A1* | 4/2015 | Lin | B05B 1/1618 239/446 |
| 2016/0059241 | A1* | 3/2016 | Rexach | B05B 1/185 239/562 |
| 2017/0018919 | A1 | 1/2017 | Chen et al. | |
| 2017/0189919 | A1 | 7/2017 | Mei | |
| 2022/0062924 | A1 | 3/2022 | Ying et al. | |
| 2022/0105526 | A1 | 4/2022 | Hofman | |
| 2022/0113020 | A1 | 4/2022 | Wu et al. | |
| 2022/0134360 | A1 | 5/2022 | Lin et al. | |

FOREIGN PATENT DOCUMENTS

| | | | |
|---|---|---|---|
| DE | 39 07 379 | A1 | 5/1990 |
| DE | 10 2012 018 878 | A1 | 3/2014 |

OTHER PUBLICATIONS

Offo Shower Head Holder for Handheld Shower Head, May 27, 2022, amazon.ca, Jun. 8, 2023, URL: https://www.amazon.ca/OFFO-Shower-Handheld-Adjustable-Connecting/dp/B09YRL52LG/ (Year: 2022).

Alfi Brand LED12R-BN Nickel 12" Round Led Rain Shower Head, May 8, 2017, amazon.ca, Jun. 13, 2022, URL: https://www.amazon.ca/dp/BO6XPPS2BT/ref=sbl_dpx_ca-home-improvement-bathroom-fixed-showerheads_B01FZUAZL8_07?th=1 (Year: 2017).

Bright Showers, "High Pressure Round Rainfall Shower Head," Feb. 23, 2018, amazon.ca, retrieved Apr. 6, 2022, URL: https://www.amazon.ca/dp/B079J5KGNL/ref=sbl_dpx_ca-home-improvement-bathroom-fixed-showerheads_BO85NGHNYW_0?th=1 (Year: 2018).

Chinese Office Action on CN Appl. Ser. No. 201910776346.3 dated Nov. 2, 2020 (13 pages).

Chinese Second Office Action on CN Appl. Ser. No. 201910776346.3 dated May 31, 2021 (10 pages).

ET Industries, "Luxury High Pressure Rain Shower Head Thunderhead," Jan. 20, 2019, amazon.ca, retrieved Apr. 6, 2022, URL: https://www.amazon.ca/Luxury-High-Pressure-Shower-Thunderhead/dp/BO7MYPZGWJ/ (Year: 2019).

European Examination Report on EP App. Ser. No. 19192979.3 dated Jan. 3, 2022 (5 pages).

Examination Report on IN Appl. Ser. No. 201914033677 dated Oct. 14, 2020 (6 pages).

Extended European Search Report on EP Appl. Ser. No. 19192979.3 dated Jan. 16, 2020 (8 pages).

NearMoon, "Rain Shower Head with 11" Adjustable Arm," NearMoon High Pressure Stainless Steel Rainfall Showerhead, May 20, 2019, amazon.ca, retrieved Apr. 6, 2022, URL: https://www.amazon.ca/Adjustable-Showerhead-Ultra-Thin-Design-Best-Experience/dp/B07QLSZWNG6/ (Year: 2019).

Shower Head, 8-Inch Chrome Finish Rainfall ShowerHead, Jun. 14, 2018, amazon.ca, Jun. 13, 2022, URL: https://www.amazon.ca/dp/B07DQKGT5P/ref=sbl_dpx_ca-home-improvement-bathroom-fixed-showerheads_B09C5WZ3M9_07?th=1 (Year: 2018).

* cited by examiner

SHOWERHEAD

CROSS-REFERENCE TO RELATED PATENT APPLICATIONS

This application is a continuation of U.S. patent application Ser. No. 16/547,265, filed Aug. 21, 2019, which claims the benefit of and priority to U.S. Provisional Patent Application No. 62/721,332, filed Aug. 22, 2018, all of which are hereby incorporated by reference in their entirety.

BACKGROUND

The present application relates generally to the field of showers. More specifically, the present application relates to a showerhead.

Generally speaking, a showerhead can dispense water from above a user-occupied space within a shower. The showerhead can be connected to a water source via a household water supply line extending from a side wall or an upper wall of a fixed structure, such as a building or a shower enclosure. The showerhead can produce a spray of water to facilitate cleaning operations and/or to enhance user comfort by more fully covering the user in water. Conventional showerheads typically include internal components/mechanisms and nozzles that produce a water spray of varying patterns and intensities. The nozzles can also restrict the flow of water to minimize water consumption during a shower event.

SUMMARY OF THE INVENTION

One exemplary embodiment relates to a showerhead. The showerhead includes a flow device and a flow distribution member. The flow device is configured to produce a substantially laminar fluid stream. The flow distribution member is coupled to the flow device and is spaced apart from the flow device. The flow distribution member is configured to receive the substantially laminar fluid stream from the flow device and to produce a distributed fluid flow.

Another exemplary embodiment relates to a showerhead. The showerhead includes a showerhead connector, a support member, a flow device, and a flow distribution member. The flow device is coupled to the showerhead connector and is configured to produce a substantially laminar fluid stream. A first end of the support member is coupled to at least one of the showerhead connector, the support member, or the flow device. The flow distribution member is coupled to a second end of the support member and is configured to produce a distributed fluid flow.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
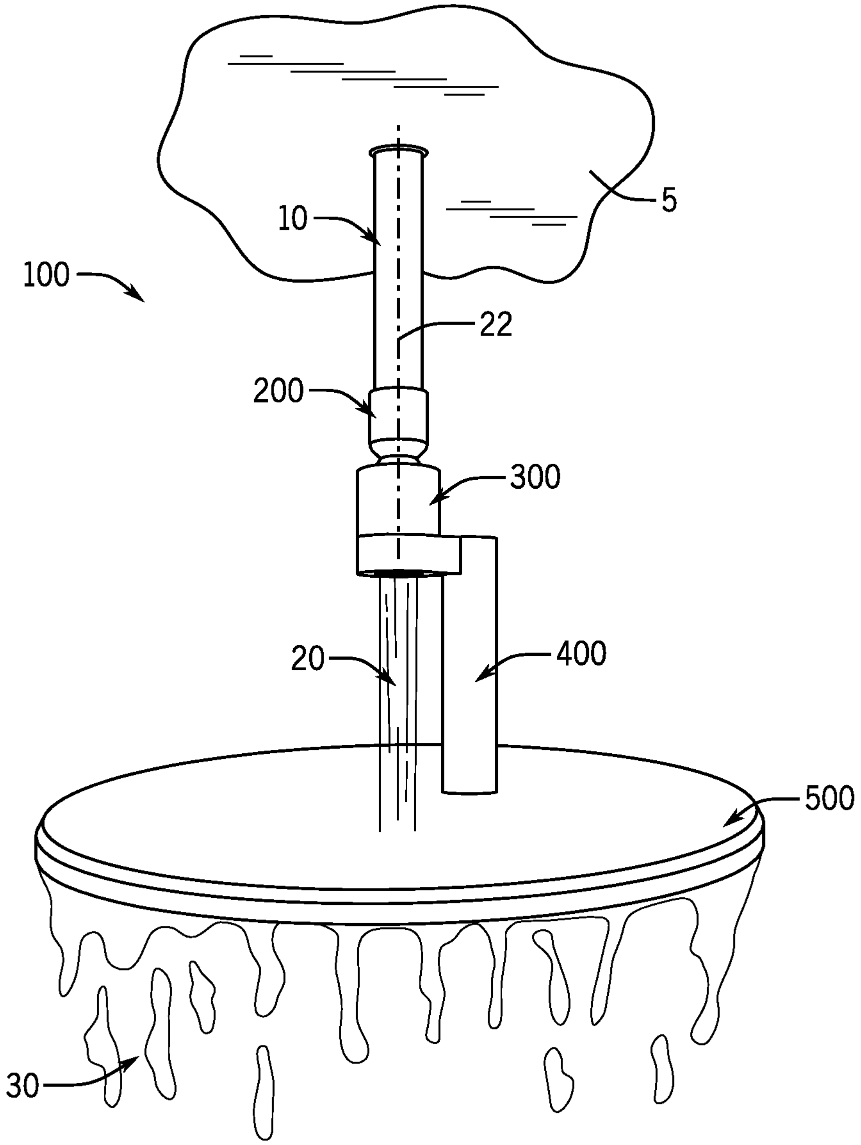
FIG. 1 is a top perspective view of a showerhead in operation in a shower, according to an exemplary embodiment.

Referring generally to the FIGURES, disclosed herein are various exemplary embodiments of a showerhead (e.g., water delivery device, flow distribution assembly, etc.). The showerhead is configured to be coupled to a water source through a water supply conduit within the shower. The showerhead is configured to produce two different flow arrangements (e.g., flow patterns, flow characteristics, flow structures, etc.), both of which are visible to a user or occupant of the shower. A first flow arrangement is a substantially laminar flow arrangement, while a second flow arrangement is a rainfall or waterfall flow arrangement that is distributed to a user. Among other benefits, the flow arrangements disclosed herein provide for a more relaxing shower experience and a more pleasing aesthetic to a user or occupant of the shower, as compared to conventional spray heads. In addition, the disclosed showerheads have a more efficient structural design that helps limit water flow restrictions and the accumulation of bacteria.

According to an exemplary embodiment, the showerhead includes a showerhead connector, a flow device, a support member, and a flow distribution member. In some embodiments, the showerhead is configured as a retrofit showerhead assembly including a showerhead connector configured to fluidly couple the showerhead to a water source, such as through a household water supply conduit. The showerhead connector may include a pivoting member to allow a user to reposition the showerhead to modify flow characteristics or to provide an improved aesthetic appearance.

The flow device is configured to produce a substantially laminar fluid stream over a first coverage area above the flow distribution member. The flow distribution member is configured to produce, from the substantially laminar fluid stream, a distributed fluid flow over a second coverage area. The second coverage area may be larger than the first coverage area to more fully cover a user with water. The distributed fluid flow may be provided in a waterfall or a rainfall flow configuration, pattern, or arrangement for an enhanced user experience. Advantageously, the distribution member is open to the atmosphere, which allows water to drain quickly and completely after each use, thereby limiting flow restrictions and the accumulation of bacteria. Furthermore, because the showerhead relies on gravity to produce the distributed fluid flow, the showerhead may be used across a wide range of flow rates.

The flow distribution member is coupled by the support member to at least one of (one, or a combination of) the water source (e.g., the water supply conduit), the showerhead connector, or the flow device. The support member may be a hollow vertical post configured to receive a fastener and thereby conceal the fastener from a user's view. The fastener may be used to fixedly couple the support member to the flow distribution member. A first end of the support member may be rotatably coupled to the water source, the flow device, and/or the showerhead connector to allow a user to reposition the support member relative to the substantially laminar fluid stream.

The flow distribution member may be a substantially planar surface or plate that faces the flow device. Water received on an upper surface of the plate is distributed radially outward toward an outer perimeter of the plate. The plate may include a lip disposed on the outer perimeter of the plate. The lip may be configured to distribute water in a waterfall pattern. A user positioned below the plate may be at least partially shielded from water by the plate, allowing the user to immerse their body with water while keeping their head dry. Alternatively, the plate may include a plurality of holes or perforations to distribute water from the plate in a rainfall pattern. These and other advantageous features will become apparent to those reviewing the present disclosure and figures.

Referring to FIGS. 1-4, a showerhead 100 is shown according to an exemplary embodiment. The showerhead 100 includes a showerhead connector 200 fluidly coupled to a water source within a shower enclosure 5. In particular, the showerhead connector 200 is removably coupled to a water supply conduit. In some embodiments, the water supply conduit is configured as a water pipe extending from an upper wall of the shower enclosure 5. In other embodiments, the water supply conduit is a pipe, tube, or other water delivery mechanism extending from a side wall of the shower enclosure 5. In the exemplary embodiment of FIG. 1, the water supply conduit is a pipe 10 disposed centrally within the upper wall of the shower enclosure 5 and extending vertically downward from the upper wall.

Figure 5:
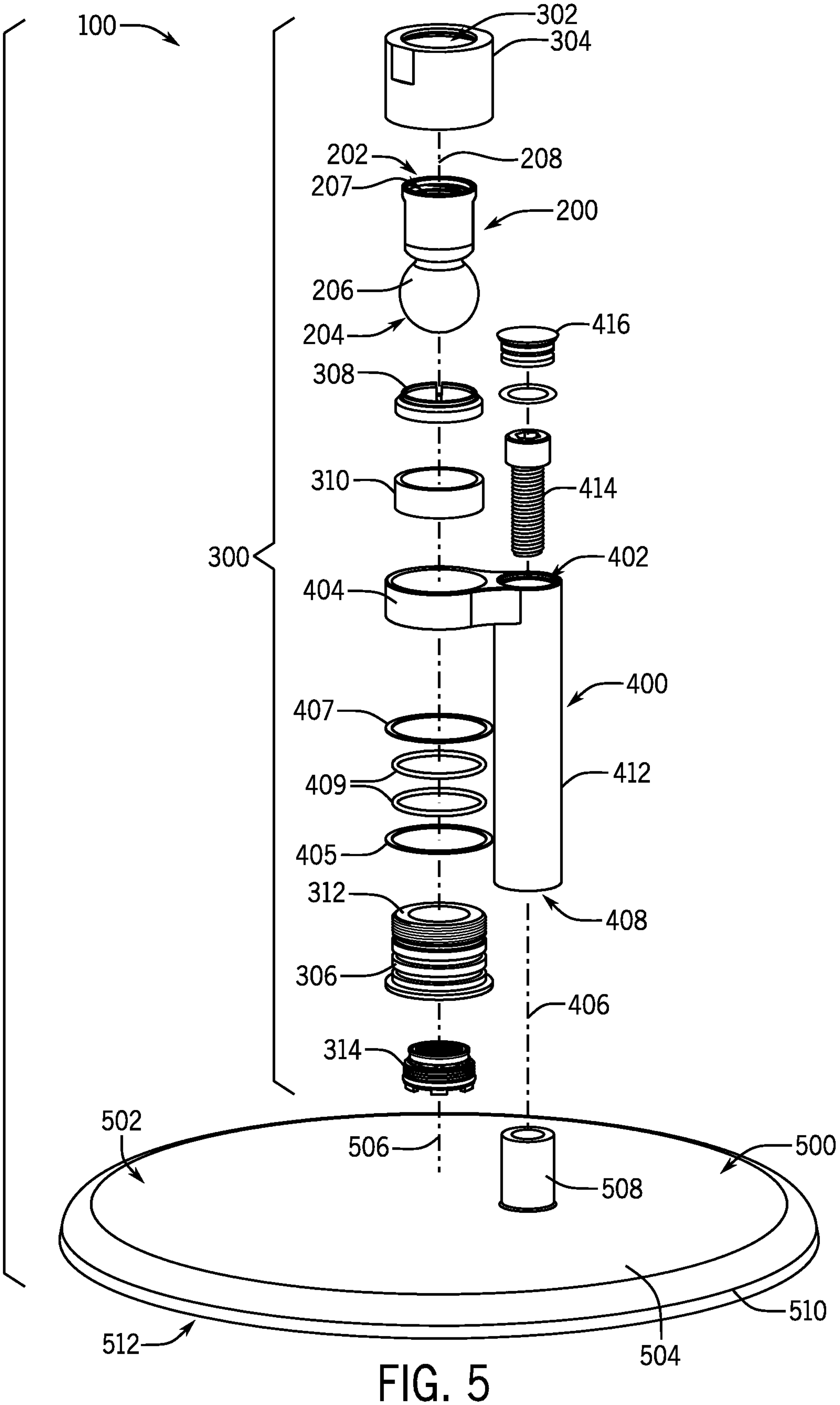
FIG. 5 is an exploded perspective view of the showerhead of FIG. 2.

As shown in FIG. 5, the showerhead 100 includes a flow device 300, a support member (shown as support post 400), and a flow distribution member (shown as distribution plate 500). The flow device 300 is pivotably coupled to the showerhead connector 200 such that the flow device 300 may pivot at a connection point between the flow device 300 and the showerhead connector 200 (see FIG. 4). In the embodiment of FIGS. 1-4, the flow device 300 extends vertically downward from the connector 200.

Figure 2:
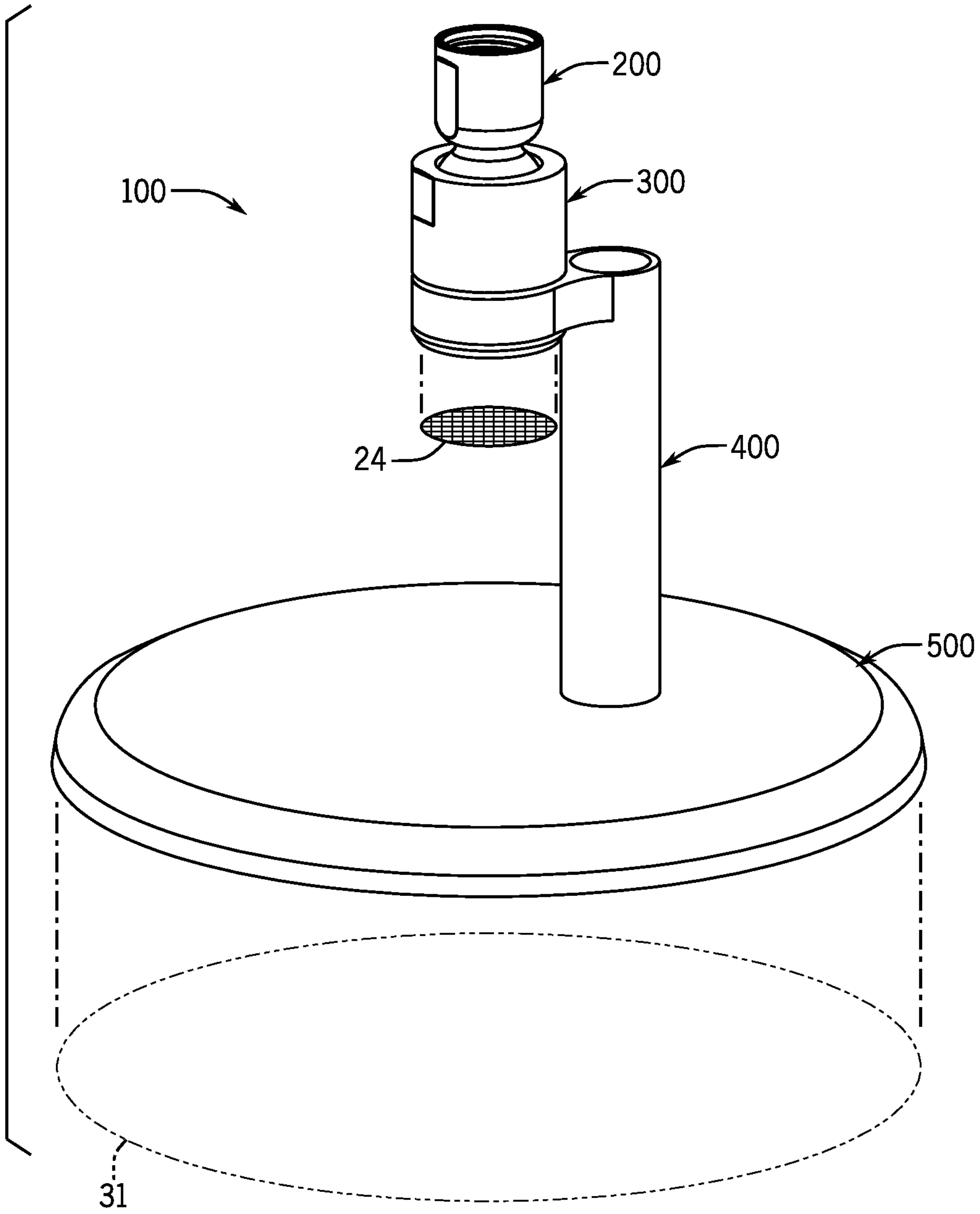
FIG. 2 is a top perspective view of the showerhead of FIG. 1, according to an exemplary embodiment.
Figure 3:
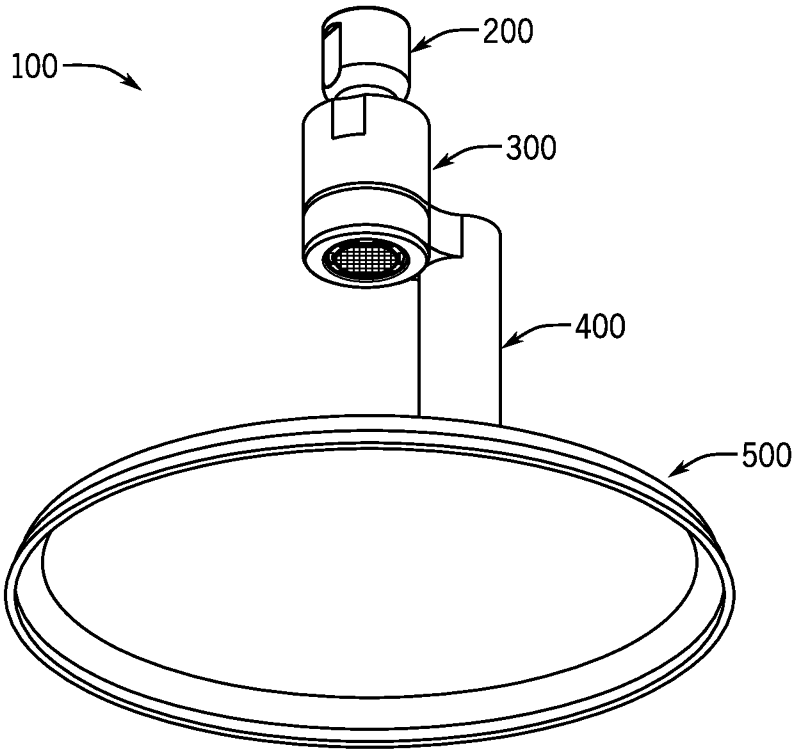
FIG. 3 is a bottom perspective view of the showerhead of FIG. 2.
Figure 4:
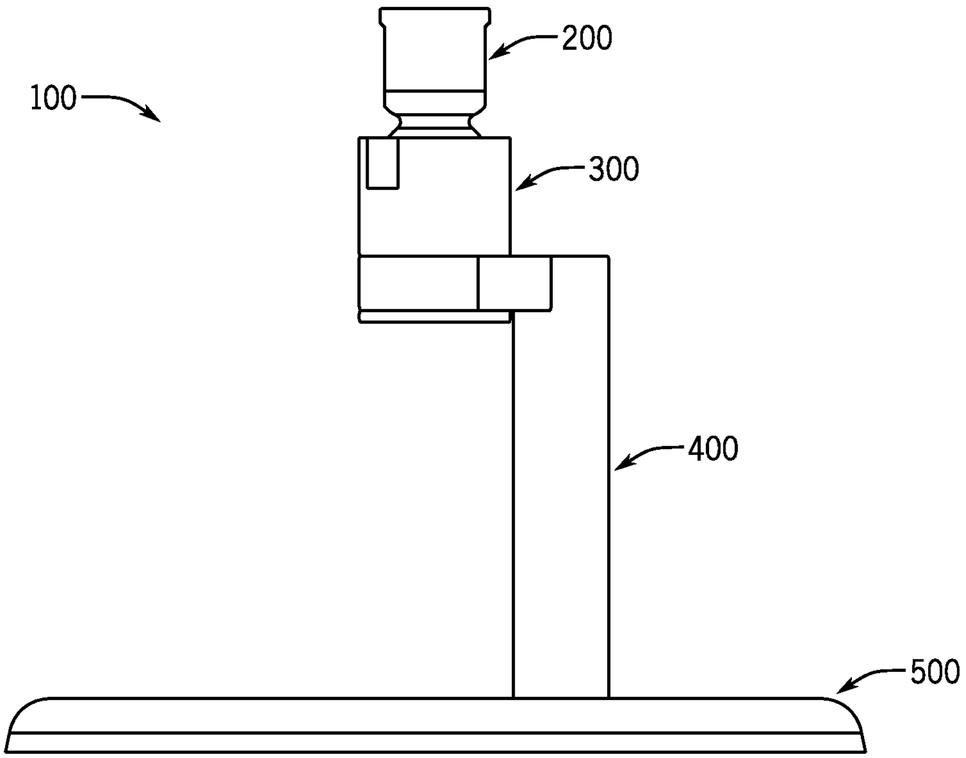
FIG. 4 is a front view of the showerhead of FIG. 2.

The flow device 300 is configured to produce a stream of fluid having a substantially laminar flow, shown as fluid stream 20 (see FIG. 1). As shown in FIG. 2, the fluid stream 20 is produced over a first coverage area 24. The fluid stream 20, extending between the flow device 300 and the distribution plate 500, is visible to a user or occupant of the shower (see FIG. 1).

The support post 400 is disposed between the flow device 300 and the distribution plate 500 and is configured to carry the full weight of the distribution plate 500. As shown in FIG. 5, a first end 402 of the support post 400 is rotatably coupled to the flow device 300 via an extension piece 404. The extension piece 404 extends radially outward from a primary axis 406 of the support post 400 such that the support post 400 is clear of the fluid stream 20 (i.e., the support post 400 does not disrupt the fluid stream 20 at any position along the fluid stream 20). As shown in FIG. 1, the support post 400 is oriented in a direction that is substantially parallel to the fluid stream 20.

As shown in FIG. 5, a second end 408 of the support post 400 is coupled to the distribution plate 500 proximate to a central axis 506 of the distribution plate 500. The distribution plate 500 is configured to produce a flow of water characterized by a second flow arrangement, shown as distributed fluid flow 30 (see FIGS. 1-2). The distribution plate 500 includes a base, shown as wall 502, configured to receive the fluid stream 20 produced by the flow device 300. As shown in FIG. 1, the wall 502 is oriented normal to a primary axis 22 of the fluid stream 20. The wall 502 is configured to receive the fluid stream 20 on an upper surface 504 of the wall 502.

The fluid stream 20 contacts the wall 502 at a central position along an upper surface 504 proximate to a central axis 506 of the distribution plate 500 (see also FIG. 5). Water received by the upper surface 504 is distributed by gravity radially along the upper surface 504 toward an outer perimeter of the wall 502. Water falls from (i.e., separates from) the outer perimeter of the wall 502 as the distributed fluid flow 30. In the embodiment of FIG. 1, the distributed fluid flow 30 is configured in a waterfall pattern that surrounds a second coverage area 31 (see FIG. 2), along an outer perimeter of the second coverage area 31, with water. In various alternative embodiments, the flow pattern generated by the distributed fluid flow 30 along with other flow characteristics of the distributed fluid flow 30 may be different.

Figure 6:
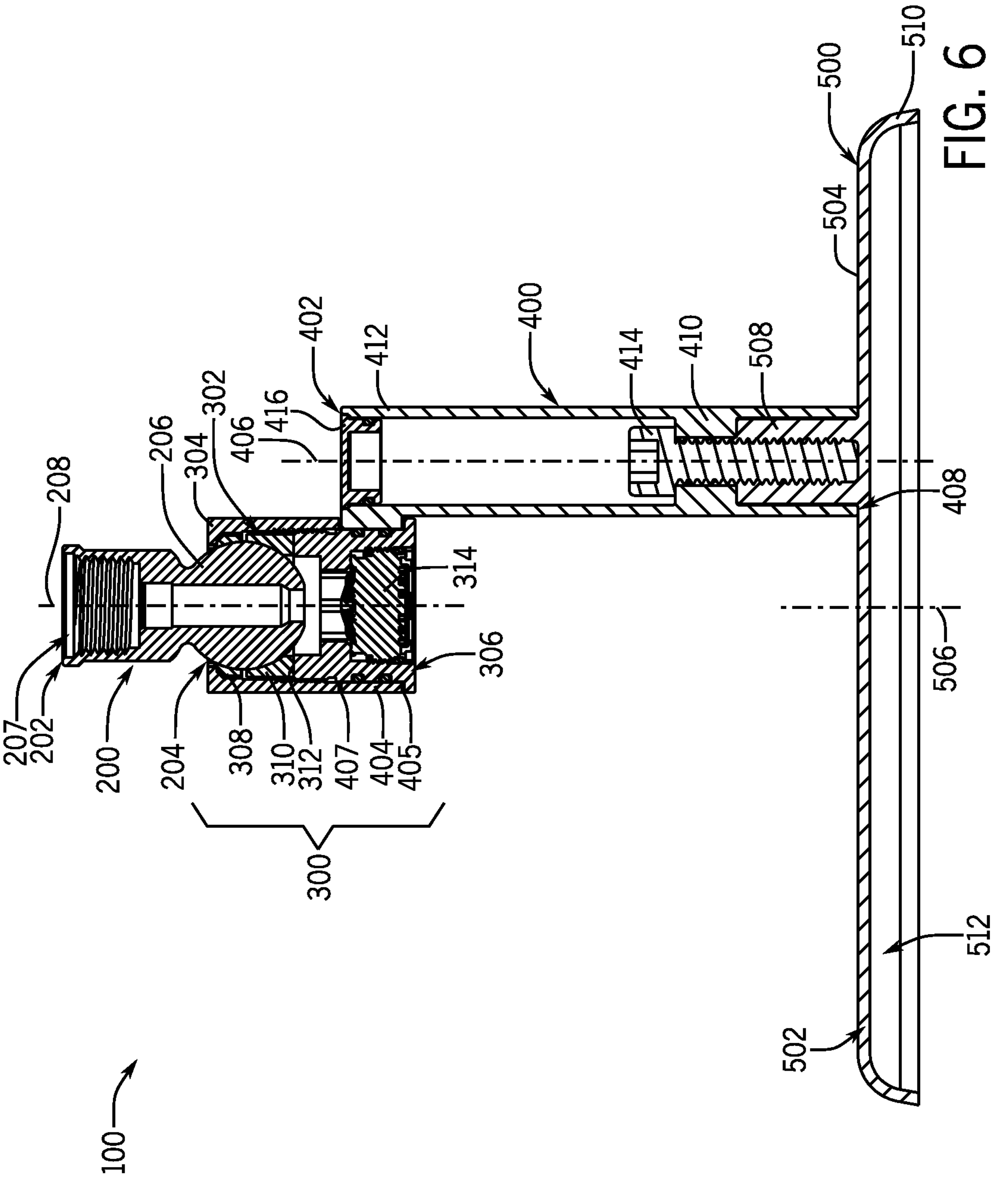
FIG. 6 is a cross-sectional view of the showerhead of FIG. 2.

Referring again to FIGS. 5-6, the showerhead connector 200 is made from a single piece of material such as brass, stainless-steel, or another corrosion resistant material. The showerhead connector 200 includes a first connecting end 202 and a second connecting end 204. The first connecting end 202 is configured to be coupled to a water source (e.g., a water supply line, etc.). As shown in FIG. 6, the first connecting end 202 includes a threaded interface that removably couples the showerhead connector 200 to the water source, although in alternative embodiments any suitable water-tight connection mechanism may be used.

The second connecting end 204 of the showerhead connector 200 includes a pivot member 206. As shown in FIGS. 5-6, the pivot member 206 is configured as a smooth spherical surface (i.e., ball joint) configured to engage with the flow device 300. The showerhead connector 200 additionally includes an opening, shown as connector opening 207, extending along a primary axis 208 of the showerhead connector 200. The connector opening 207 fluidly couples the first connecting end 202 with the second connecting end 204. In other embodiments, the showerhead connector 200 further includes a flow regulator disposed within the connector opening 207 and configured to control the flow rate of water through the connector 200.

As shown in FIGS. 5-6, the flow device 300 includes a body 302 including an outer body portion 304 and an inner body portion 306. The outer body portion 304 is a cylindrical sleeve made from a single piece of material. In an exemplary embodiment, the outer body portion 304 is a metal sleeve stamped or otherwise formed from brass, stainless steel, or another corrosion resistant material. The outer body portion 304 is configured to receive the second connecting end 204 of the showerhead connector 200 and an upper end of the inner body portion 306. As shown in FIG. 6, the outer body portion 304 fits over the first connecting end 202 of the showerhead connector 200 and is coupled against the smooth spherical surface of the pivot member 206 for the showerhead connector 200.

The flow device 300 is pivotably coupled to the second connecting end 204 of the showerhead connector 200. The flow device 300 includes an upper bearing 308 and a lower bearing 310 disposed in an inner cavity of the outer body portion 304. The upper bearing 308 and the lower bearing 310 are each formed from a single piece of material (e.g., plastic or another suitable polymer) and are slidably coupled to the pivot member 206. As shown in FIG. 6, the pivot member 206 is sandwiched between the upper bearing 308 and the lower bearing 310. The lower bearing 310 is secured in position by the inner body portion 306. Similar to the outer body portion 304, the inner body portion 306 is a cylindrical sleeve made from a single piece of material. In an exemplary embodiment, the inner body portion 306 is a metal sleeve stamped or otherwise formed from brass, stainless steel, or another corrosion resistant material. The inner body portion 306 engages with the outer body portion 304 and is secured in position relative to the outer body portion 304. In the embodiment of FIGS. 5-6, the inner body portion 306 includes a threaded interface that engages with the outer body portion 304 along an inner surface of the outer body portion 304. An interface surface 312 of the inner body portion 306 presses against the lower bearing 310.

The force applied to the lower bearing 310 by the inner body portion 306 results in a contact pressure between the bearings 308, 310 and the pivot member 206. The contact pressure may be adjusted by rotating the inner body portion 306 relative to the outer body portion 304. In the exemplary embodiment of FIG. 6, the contact pressure between the bearings 308, 310 and the pivot member 206 is adjusted to allow the flow device 300 to freely pivot relative to the showerhead connector 200. Among other benefits, this allows a user to adjust a discharge angle of the fluid stream 20 (see also FIG. 1) relative to the primary axis 208 of the showerhead connector 200.

The flow device 300 includes an aerator 314 configured to produce a fluid stream characterized by a laminar flow arrangement. The aerator 314 may be one of a variety of different laminar flow attachments. In some embodiments, the aerator 314 may be an aerator insert such as a Neoperl® aerator. The aerator 314 may be flow-regulated to meter the flow rate and to ensure that the flow produced by the aerator 314 is laminar. In some embodiments, the aerator 314 is removably coupled to the inner body portion 306. The aerator 314 used in the embodiment of FIGS. 5-6 includes a threaded interface that engages with the inner body portion 306 along an inner surface of the inner body portion 306. The threaded configuration facilitates cleaning or replacement of the aerator 314 in the event of hard water buildup or other particulate obstruction. In alternative embodiments, the aerator 314 is permanently coupled to the inner body portion 306 (e.g., glued to the inner body portion 306, welded to the inner body portion 306, or integrally formed with the inner body portion 306 as a single unitary structure). As shown in FIG. 6, the aerator 314 is recessed into an outer surface of the inner body portion 306, which improves the aesthetic appearance of the showerhead 100.

The flow device 300 is configured to produce a substantially laminar flow arrangement, shown as fluid stream 20 (see also FIG. 1) over a first coverage area 24 (see FIG. 2), the diameter of which is approximately equal to the diameter of the aerator 314. In the embodiment of FIGS. 5-6, the aerator 314 is configured to produce a cylindrical stream of fluid, which is ejected from the aerator 314 and out through an aperture in the inner body portion 306. In other embodiments, the geometry of the fluid stream 20 (see also FIG. 1) may be different. In some embodiments, the flow device 300 may include multiple aerators 314 to improve the distribution of flow on the distribution plate 500 or to improve the aesthetic appearance of the showerhead 100. The aerators 314 may be arranged side-by-side, staggered vertically, or configured in another arrangement depending on functional requirements and user preference.

Among other assembly components, the showerhead 100 includes a plurality of sealing members to prevent water from bypassing the aerator 314. As shown in FIGS. 5-6, the showerhead 100 includes an O-ring positioned in an annular space between the inner body portion 306 and the outer body portion 304, outboard of the threaded interface for the inner body portion. The O-ring is disposed within a circumferential groove on an outer radial surface of the inner body portion 306. Another O-ring is included outboard of the threaded interface for the aerator 314 (i.e., between the aerator 314 and the inner body portion 306 on an outer radial surface of the aerator 314). A third O-ring may be included inboard of the threaded interface for the aerator 314. In other embodiments, more or fewer O-rings and/or other sealing members may be included.

The support post 400 for the showerhead 100 is configured to couple one or a combination of the water source, the showerhead connector 200, and/or the flow device 300 to the distribution plate 500. As shown in FIGS. 5-6, the support post 400 is configured to couple the flow device 300 to the distribution plate 500. The support post 400 includes a first end 402 and a second end 408 disposed opposite the first end 402. A distance between the flow device 300 and the distribution plate 500 is determined by a length of the support post 400 (e.g., a vertical length of the support post, a length of the support post 400 parallel to the primary axis 406 of the support post 400, etc.). In the embodiment of FIGS. 5-6, the distance between the flow device 300 and the support post (i.e., a distance between the aerator 314 outlet and an upper surface 504 of the distribution plate 500) is within a range between approximately 3 in (7.6 cm) and about 4 in (10.2 cm). In other embodiments, the distance between the flow device 300 and the support post may be different depending on flow rate.

The support post 400 includes an extension piece 404 disposed on the first end 402 extending radially outward from a primary axis 406 of the support post 400. The extension piece 404 may be formed separately from the support post 400 or along with the support post 400 as a single body. The extension piece 404 is rotatably coupled to the flow device 300 to allow a user to reposition the support post 400 relative to the fluid stream 20. As shown in FIG. 5, the extension piece 404 is configured as a cylindrical sleeve whose inner diameter is slightly larger than an outer diameter of the inner body portion 306. Among other benefits, this connection mechanism allows the support post 400 to rotate a full 360° about the inner body portion 306 (and the fluid stream 20 as shown in FIG. 1).

The extension piece 404 fits over the inner body portion 306 and is secured in position between the outer body portion 304 and a circumferential step extending from an outer radial surface of the inner body portion 306 (e.g., a step or circumferential protrusion whose outer diameter is greater than the inner diameter of the extension piece 404). A washer may be disposed in an axial gap formed between the extension piece 404 and one or a combination of the inner body portion 306 and outer body portion 304 to reduce friction between the components. As shown in FIGS. 5-6, the showerhead 100 includes two low-friction plastic washers configured to facilitate movement of the support post 400 relative to the inner body portion 306. A first washer 405 is received within an axial gap formed between a lower surface of the extension piece 404 and the inner body portion 306, and a second washer 407 is received within an axial gap formed between an upper surface of the extension piece 404 and the outer body portion 304.

As shown in FIGS. 5-6, the showerhead 100 additionally includes two O-rings 409 in an annular gap between the extension piece 404 and the outer radial surface of the inner body portion 306. Each of the O-rings 409 is disposed within a circumferential groove on the outer radial surface of the inner body portion 306, which retains the O-rings 409 during normal operation. Among other benefits, the O-rings 409 help prevent fluid ingestion into the annular gap between the outer radial surface of the inner body portion and the extension piece 404, which prevents corrosion and reduces friction.

The second end 408 of the support post 400 is coupled to the distribution plate 500. As shown in FIGS. 5-6, the support post 400 is a hollow tube. The geometry of the support post 400 may vary depending on the flow requirements and user preferences. In the embodiment of FIGS. 5-6, the support post 400 is shaped as an elongated cylinder. In other embodiments, the support post 400 may take the shape of a rectangular cuboid or another shape having identical cross-sections normal to its primary axis 406. In yet other embodiments, the support post 400 is curved away from the flow device 300.

As shown in FIGS. 5-6, the second end 408 of the support post 400 is configured to receive a connecting flange, shown as flange 508, of the distribution plate 500. An inner diameter of the support post 400 is slightly larger than an outer diameter of the flange 508. As shown in FIG. 6, the support post 400 includes a circumferential step 410 that extends inward toward the primary axis 406 from an outer wall 412 of the support post 400. The circumferential step 410 engages with a fastener 414 (e.g., a bolt, screw, or another suitable fastener) that couples the support post 400 to the distribution plate 500.

As shown in FIG. 6, the fastener 414 is received by the support post 400 through the first end 402 of the support post 400 (i.e., a top of the support post 400). A head of the bolt engages with a top surface of the circumferential step 410, while a threaded portion of the fastener 414 engages with a threaded interface in the flange 508. Advantageously, the fastener 414 used to secure the support post 400 to the distribution plate 500 is not visible to a user (e.g., is hidden within the hollow portion of the support post 400), which improves the aesthetic appeal of the showerhead 100. The circumferential step 410 is positioned within the support post 400 at a sufficient depth to allow the flange 508 to be received completely within the support post 400 (i.e., to be received within the support post 400 such that the flange 508 is completely surrounded by the outer wall 412). The showerhead 100 additionally includes a plug, shown as end cap 416, configured to block off an opening in the first end 402 of the support post 400. As shown in FIG. 6, the end cap 416 includes an O-ring disposed within a circumferential groove on an outer radial surface of the end cap 416. The O-ring is configured to seal against the inner surface of the outer wall 412 and thereby prevent moisture from entering and corroding the support post 400 and/or the fastener 414. The end cap 416 is countersunk into the first end 402 of the support post 400 to improve the aesthetic appearance of the support post 400.

Still referring to FIGS. 5-6, in an exemplary embodiment the distribution plate 500 includes a base, shown as wall 502, defining a substantially planar surface oriented substantially normal to the primary axis 22 of the fluid stream 20 (also see FIG. 1), such that the planar surface faces an outlet of the flow device 300. The distribution plate 500 also includes a ledge or lip 510 disposed along a perimeter of the wall 502. The distribution plate 500 may be stamped or otherwise formed from a single piece of material (e.g., brass, stainless steel, or another corrosion resistant material). The flange 508 is coupled to the distribution plate 500 at a central position along the upper surface 504 of the wall 502. The flange 508 may be welded to the wall 502 or integrally formed with the distribution plate 500 as a single unitary structure (e.g., via a machining operation, injection molding, etc.). Advantageously, incorporating the flange 508 at a central position along the upper surface 504 allows radial space for the flow to redistribute around the support post 400 and along the wall 502 before falling from the distribution plate 500.

Together, the wall 502 and the lip 510 define a hollow cavity 512 (e.g., hollow portion) forming a cup-shape. As shown in FIG. 6, the lip 510 extends downward and away from the wall 502 (i.e., an upside down cup). In some embodiments, the lip 510 extends downward from the wall 502 in a direction that is substantially perpendicular to the wall 502. In other embodiments, an angle is formed between an upper surface of the lip 510 and an upper surface 504 of the wall 502 where the lip 510 contacts the wall 502. In yet other embodiments, the distribution plate 500 is formed without a lip 510 (e.g., as a flat plate).

The distribution plate 500 may be configured in a variety of different geometries depending on flow requirements (e.g., water flow rate and flow intensity) and user preferences. In the embodiment of FIGS. 5-6, the distribution plate 500 is configured as a circular plate having a diameter of about 12 in (30.5 cm). The distribution plate 500 is configured to provide a distributed fluid flow 30 at flow rates within a range between about 1.75 gpm (6.6 L/min water) and about 3.5 gpm (13.2 L/min). Alternatively, the distribution plate 500 may be rectangular or have both straight and curved edges. Various other geometries for the distribution plate are possible.

The distribution plate 500 produces a distributed fluid flow 30 (see also FIG. 1) over a second coverage area 31 (see FIG. 2). The distribution plate 500 is configured to receive the fluid stream 20 on the upper surface 504 of the wall 502. As shown in FIG. 1, both the fluid stream 20 and the distributed fluid flow 30 are exposed to the atmosphere (e.g., to an environment surrounding the showerhead, etc.) such that they may be viewed by a user of the shower. In other words, the fluid stream 20 and the distributed fluid flow 30 are not contained within or concealed by any components of the showerhead 100. Once received on the upper surface 504 of the wall 502, the flow distributes along a radial extent of the upper surface 504 and toward the lip 510. The flow separates from (i.e. falls from) the lip 510 proximate to an outer perimeter of the lip 510. As shown in FIG. 1, the flow may separate from the outer perimeter of the lip 510 in sheets and/or droplets, simulating the flow of a waterfall. Water is pulled by the force of gravity from the showerhead 100 toward a user, which allows the showerhead 100 to be used across a wide range of flow rates. The second coverage area 31 (see FIG. 2) for the distributed fluid flow 30 is greater than the first coverage area 24 (see FIG. 2) and is approximately equal to an area enclosed by the outer perimeter of the lip 510.

Among other benefits, the waterfall flow pattern provided by the distribution plate 500 provides a dry core region that is shielded by the wall 502. A user's head may be positioned within this region, immediately below the wall 502, and remain dry, while the rest of the user's body is covered or partially covered in fluid from the distributed fluid flow 30.

Figure 7:
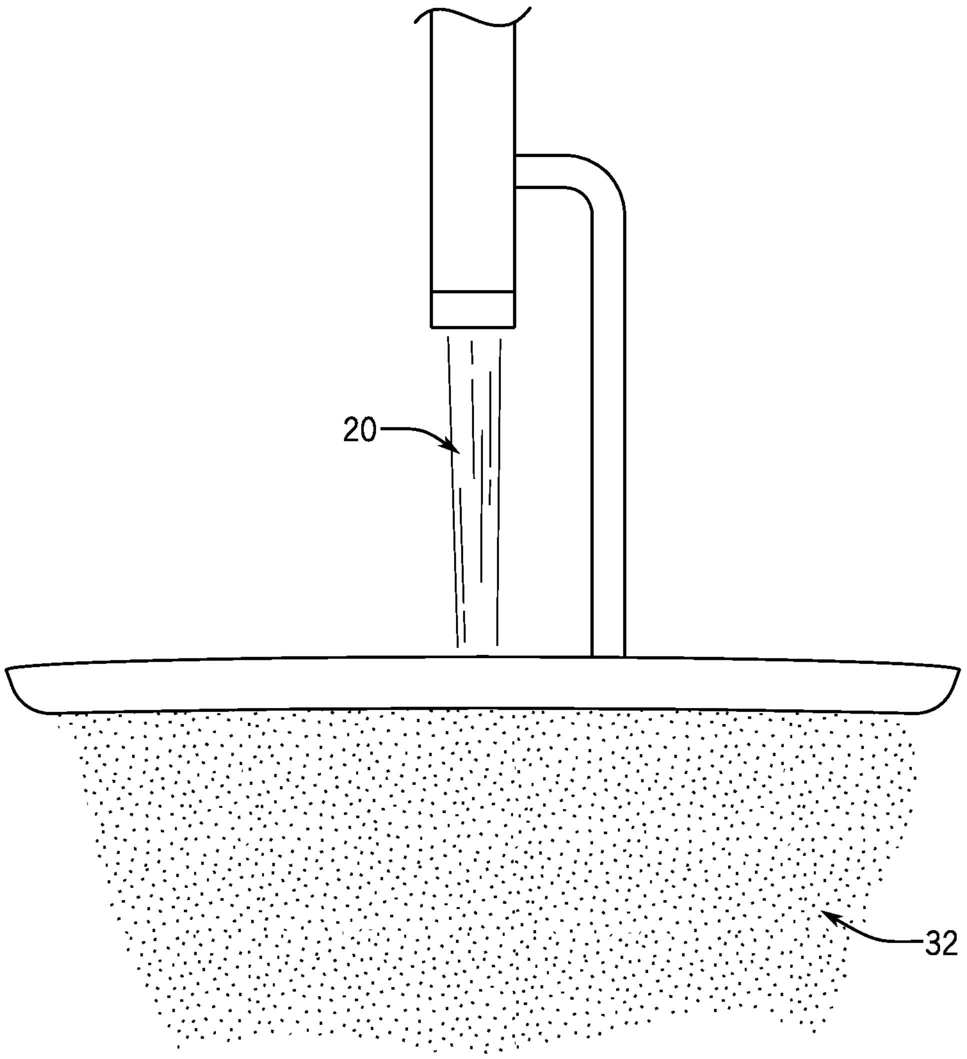
FIG. 7 is a front view of a showerhead in operation in a shower, according to another exemplary embodiment.

Various other exemplary embodiments of the showerhead 100 are possible without departing from the inventive concepts described herein. For example, FIG. 7 shows a showerhead for a shower configured to produce a distributed fluid flow 32 in a rainfall pattern, according to an exemplary embodiment. A similar showerhead, shown as showerhead 1000, is illustrated conceptually in FIGS. 8-10. The showerhead 1000 includes a showerhead connector, shown as connector 1200, a flow device 1300, a support member, shown as support post 1400, and a flow distribution member, shown as distribution plate 1500. Each of the connector 1200, flow device 1300, and support post 1400 may be substantially similar to that shown in the embodiment of FIGS. 2-6.

Figure 8:
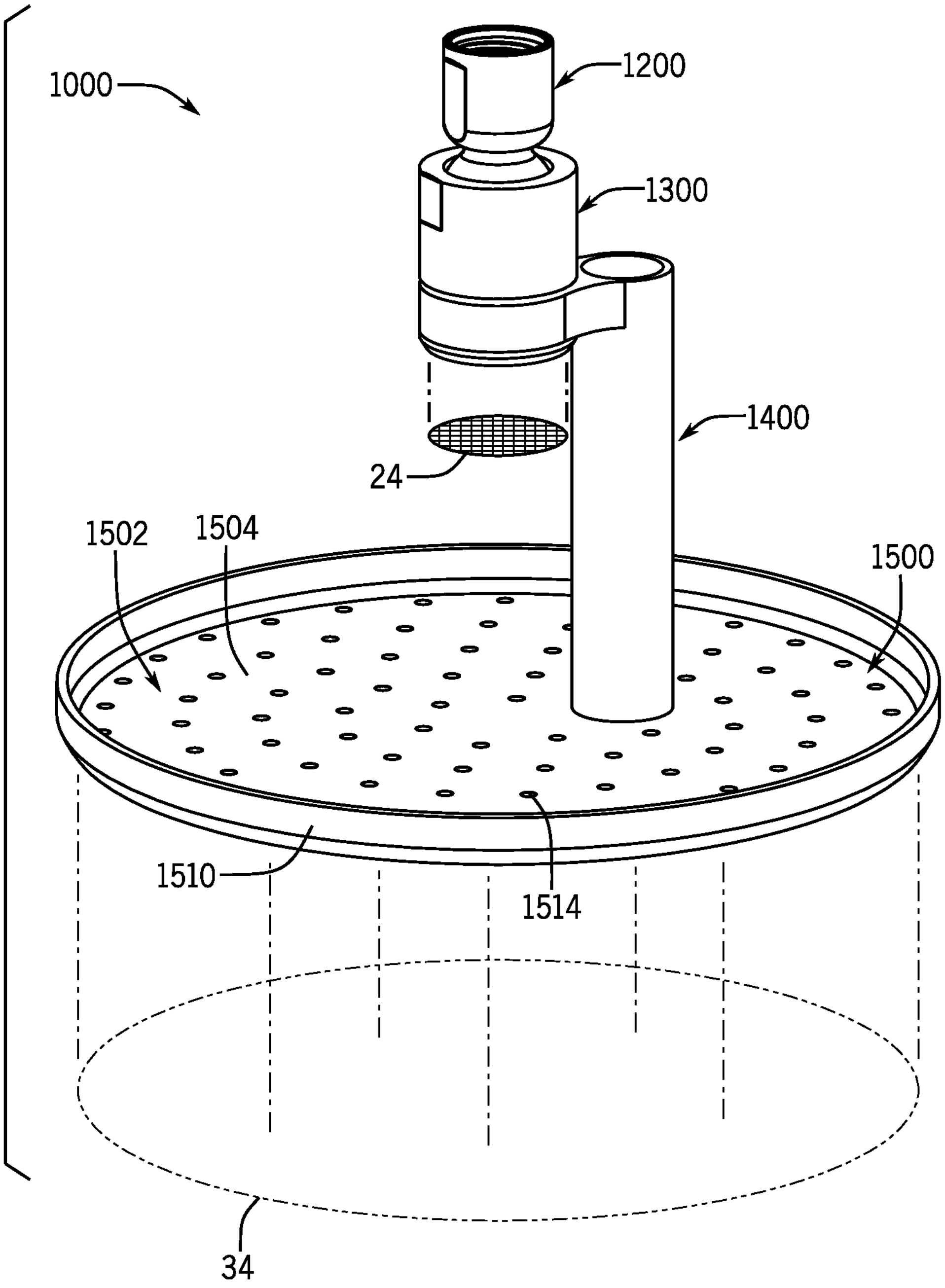
FIG. 8 is a top perspective view of a showerhead, according to another exemplary embodiment.
Figure 9:
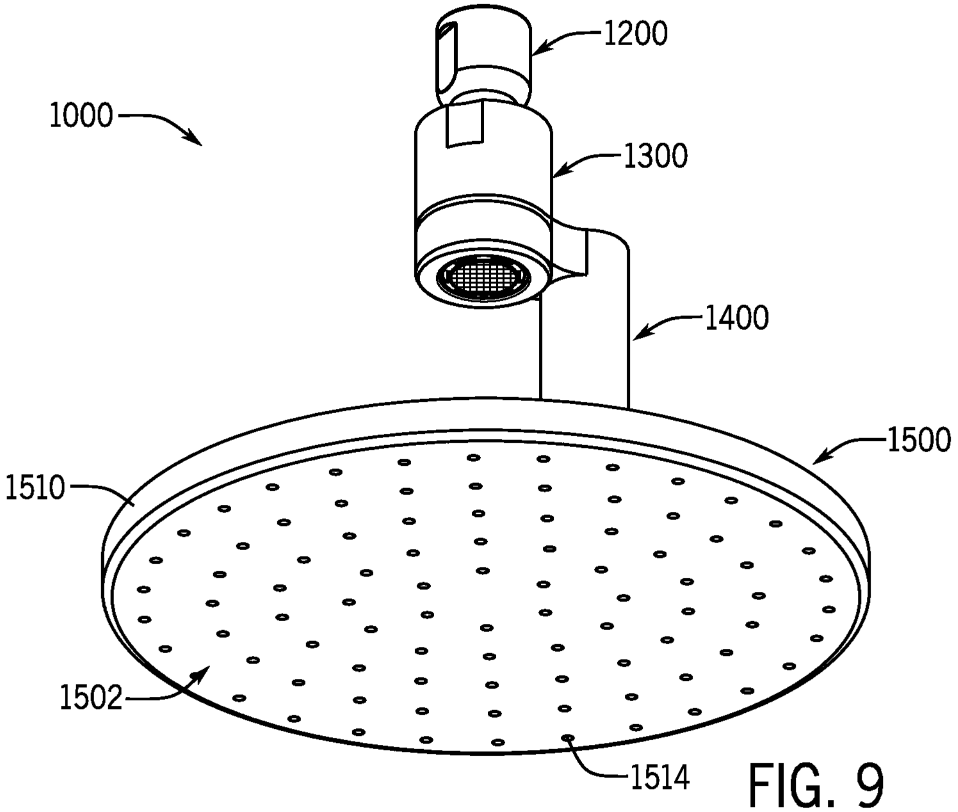
FIG. 9 is a bottom perspective view of the showerhead of FIG. 8.
Figure 10:
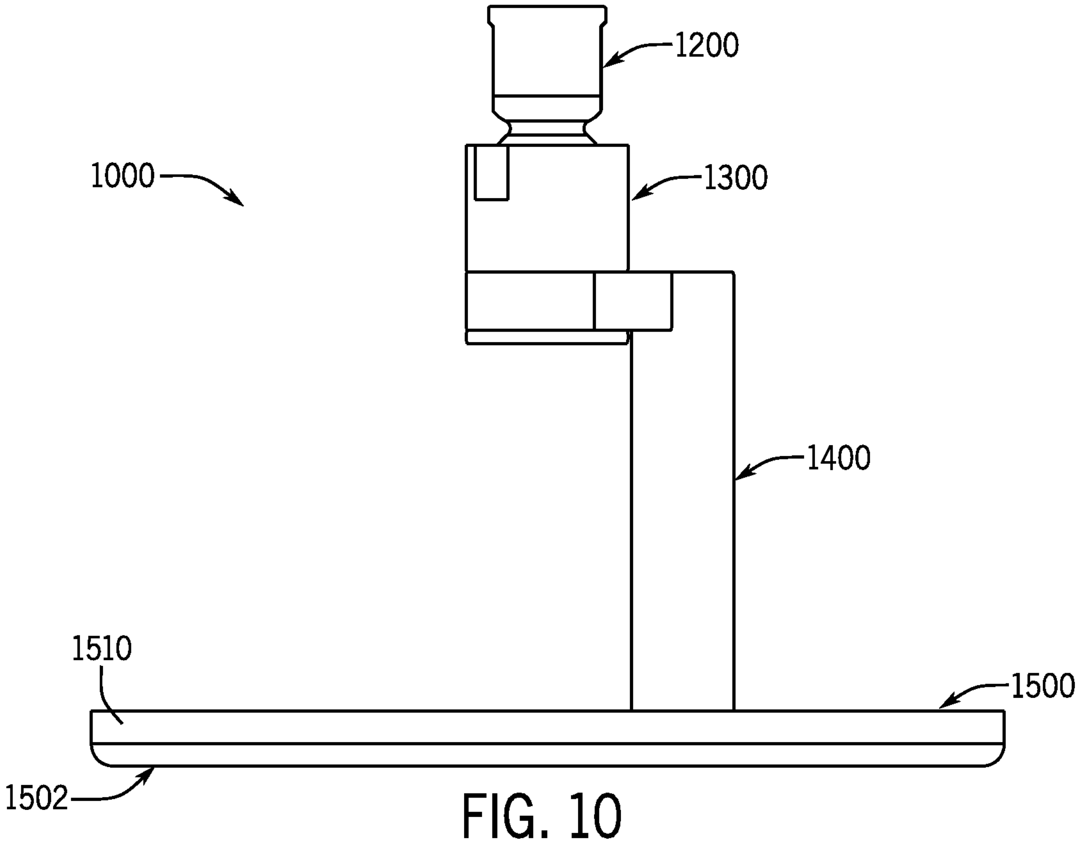
FIG. 10 is a front view of the showerhead of FIG. 8.
Figure 11:
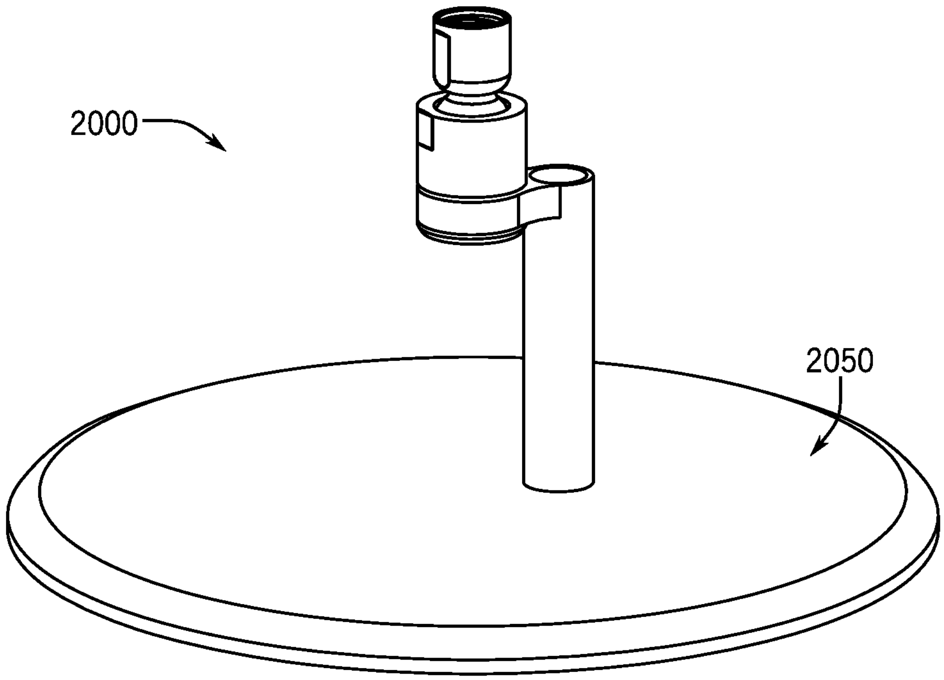
FIG. 11 is a top perspective view of a showerhead, according to another exemplary embodiment.
Figure 12:
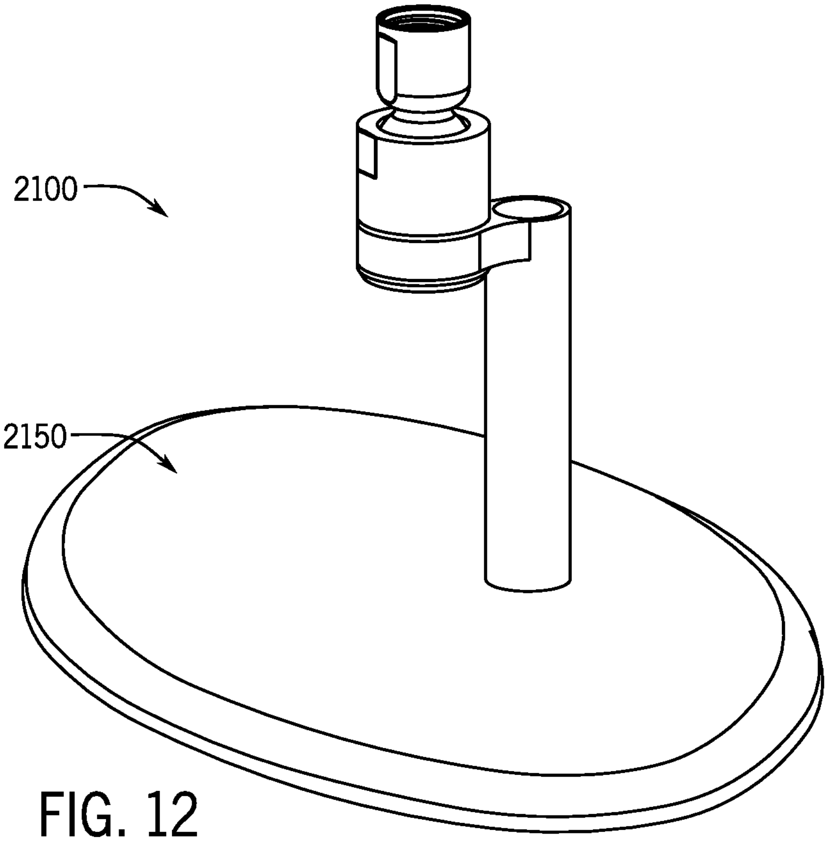
FIG. 12 is a top perspective view of a showerhead, according to another exemplary embodiment.

The distribution plate 1500 of FIGS. 8-10 includes a base, shown as wall 1502, and a ledge or lip 1510 disposed on the wall 1502 along a perimeter of the wall 1502. The wall 1502 defines a substantially planar surface. The lip 1510 extends upward from the outer perimeter of the wall 1502 such that an outer surface of the lip 1510 is substantially perpendicular to an upper surface 1504 of the wall 1502. Together, the wall 1502 and the lip 1510 define a hollow cavity (i.e., a hollow cavity forming an upward facing cup shape) within which the fluid stream 20 is received. The distribution plate 1500 includes a plurality of perforations 1514 (e.g., openings, holes, nozzles, etc.) disposed in the wall 1502 and configured to dispense water as a distributed fluid flow 32 (see also FIG. 7). The fluid is pulled through the perforations 1514 by the force of gravity. The fluid separates from a lower surface of the wall 1502 in droplets simulating a rainfall pattern. Similar to the embodiment of FIGS. 2-6, the wetted surfaces of the distribution plate 1500 of FIGS. 8-10 are completely or substantially open to the atmosphere, thereby allowing water to drain quickly and completely after use. Any water remaining on the distribution plate 1500 after the flow of water has been terminated is allowed to evaporate freely to the surroundings.

The size, number, shape, and arrangement of perforations in the flow distribution plate 1500 may vary depending on the flow requirements for the showerhead 1000 and user preferences. In the embodiment of FIGS. 8-10, a total of about 91 circular holes are disposed in the plate 1500. The holes are distributed in concentric rows on the wall 1502, each row including a plurality of holes in a substantially circular pattern (e.g., a bullseye configuration, etc.). A diameter of the holes may also vary depending on the required flow rate of fluid (and multiple different hole diameters may be used in a single showerhead to provide droplets of different sizes to the user). In an exemplary embodiment, the diameter of each hole may be any size within a range substantially between about 0.12 in and 0.14 in. A height of the lip 1510 (e.g., a distance between an upper edge of the lip 1510 and the upper surface 1504 of the wall 1502) for the distribution plate 1500 may also vary. In some embodiments, and particularly embodiments having a large open face area (i.e., a combined open area associated with all of the holes in the distribution plate 1500), the height of the lip 1510 may be small to prevent any water from falling from the edge of the wall 1502. In other embodiments, the height of the lip 1510 may be large to allow a quantity of water to pool within the hollow cavity of the distribution plate 1500.

Figure 13:
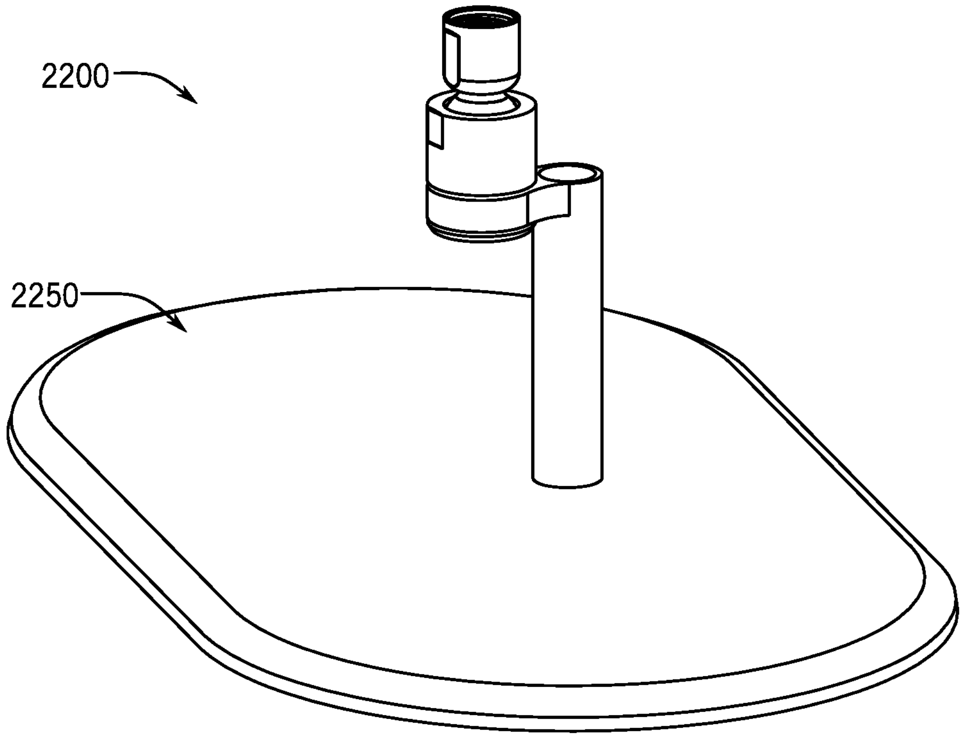
FIG. 13 is a top perspective view of a showerhead, according to another exemplary embodiment.
Figure 14:
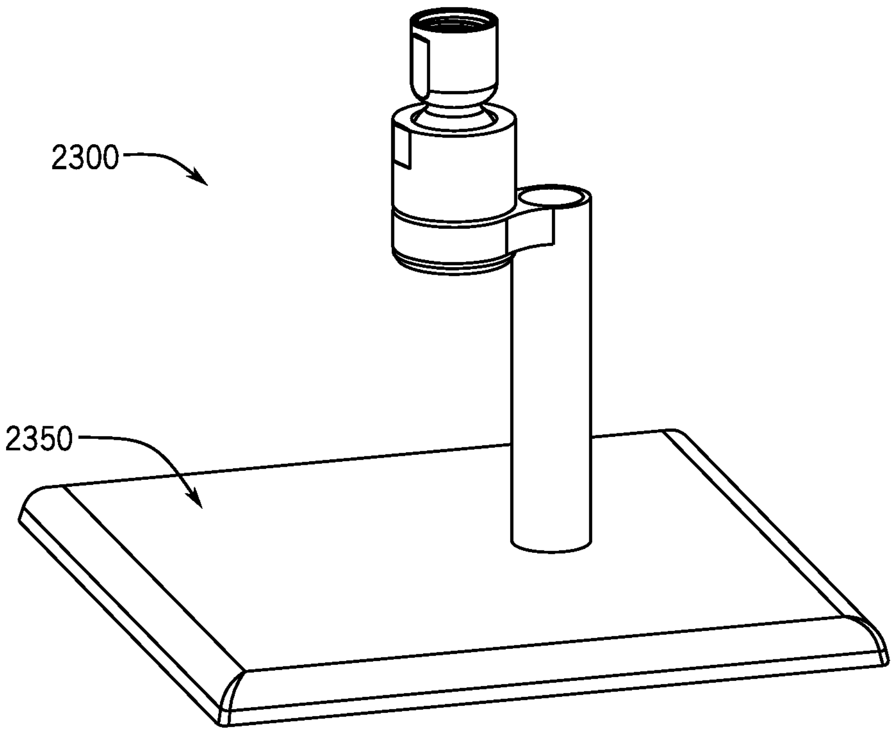
FIG. 14 is a top perspective view of a showerhead, according to another exemplary embodiment.

A second coverage area 34 (see FIG. 8) for the distributed fluid flow 32 is approximately equal to an area outlined by the outermost holes, which are proximate to an outer edge of the wall 1502 of the distribution plate 1500. The geometry of the distribution plate may vary depending on the desired coverage area (e.g., second coverage area 34) of the distributed fluid flow 32. FIGS. 11-14 show distribution plates 2050, 2150, 2250, 2350 for showerheads 2000, 2100, 2200, 2300 of a variety of different shapes and sizes, including oval (FIGS. 11-12), oval with straight and rounded edges (FIG. 13), and rectangular (FIG. 14). FIG. 13 shows a substantially oval plate 2250 for a showerhead 2200 having a lengthwise dimension 2251 of approximately 14 in. (35.6 cm) and a width 2253 of approximately 8 in. (20.3 cm). FIG. 14 shows a square plate whose edges measure approximately 8 in. (20.3) in length. The showerheads of FIGS. 11-14 are configured to produce a distributed fluid flow 30 in a waterfall pattern (see FIG. 1). Similar geometries for the distribution plates 2050, 2150, 2250, 2350 could also be used for a showerhead configured to produce a distributed fluid flow 32 in a rainfall pattern (see FIG. 7).

Figure 15:
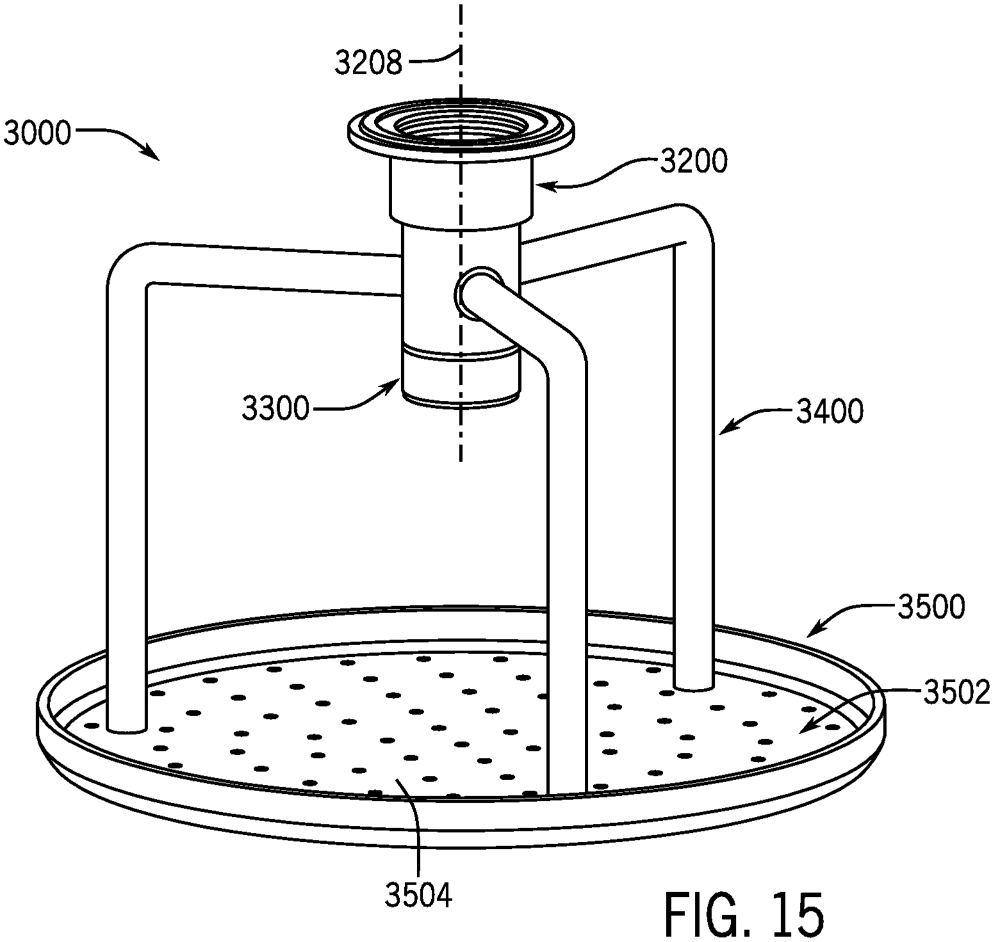
FIG. 15 is a top perspective view of a showerhead, according to another exemplary embodiment.

Another embodiment of a showerhead 3000 is shown in FIG. 15. The showerhead 3000 includes a flow device 3300 that is fixably coupled to a showerhead connector 3200. A support member 3400 for the showerhead 3000 includes a plurality of posts, which rotatably couple a distribution plate 3500 to the flow device 3300 and/or showerhead connector 3200 such that the distribution plate 3500 may rotate freely around a primary axis 3208 of the showerhead connector 3200. Each of the posts includes a horizontal portion that extends outward from the primary axis 3208 of the showerhead connector 3200 (e.g., radially outward relative to the primary axis 3208), a bent portion (e.g., a 90° bend, etc.) that extends from the horizontal portion, and a vertical portion that extends from the bent portion to an upper surface 3504 of a wall 3502 of the distribution plate 3500.

Figure 16:
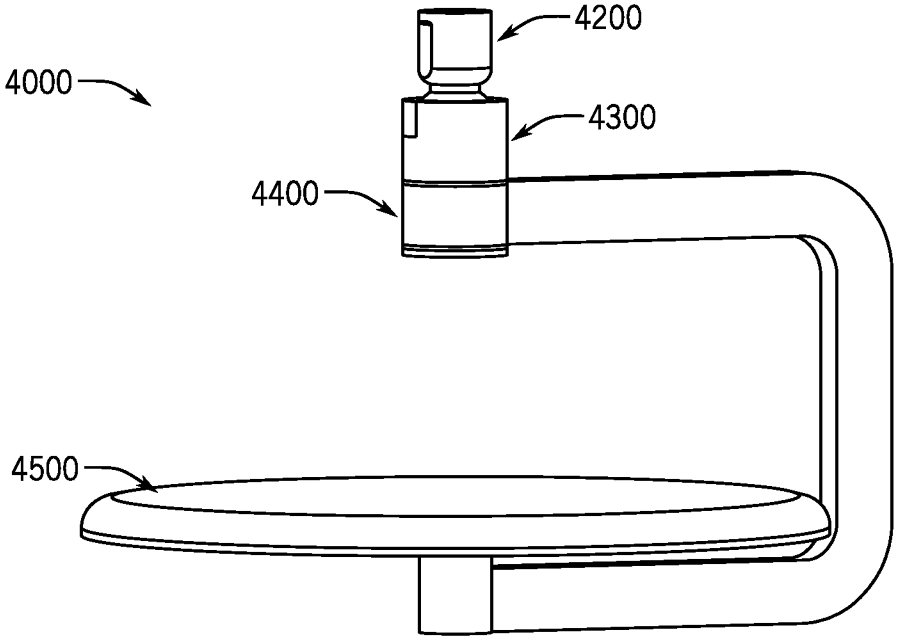
FIG. 16 is a top perspective view of a showerhead, according to another exemplary embodiment.

Yet another embodiment of a showerhead 4000 is shown in FIG. 16. The showerhead 4000 includes a flow device 4300 pivotably coupled to a showerhead connector 4200. The flow device 4300 is configured to produce a fluid stream 20 (see also FIG. 1) at a central position above a distribution plate 4500. The support member 4400 is configured to completely wrap around an outer edge of the distribution plate 4500 and connect with the distribution plate 4500 proximate to a central position (e.g., aligned with a primary axis 22 of the fluid stream 20) on a lower surface of the distribution plate 4500. Note that the waterfall pattern of fluid produced by the showerhead 4000 of FIG. 16 may be partially blocked by the support member 4400 where the support member 4400 wraps around the outer edge of the distribution plate 4500.

Figure 17:
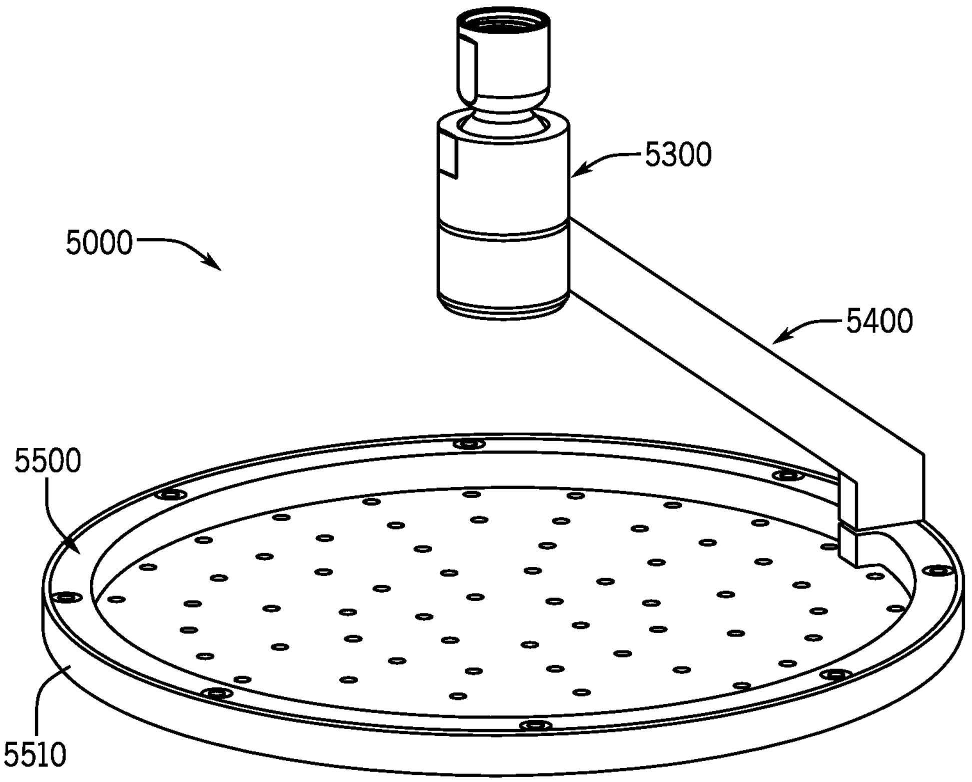
FIG. 17 is a top perspective view of a showerhead, according to another exemplary embodiment.
Figure 18:
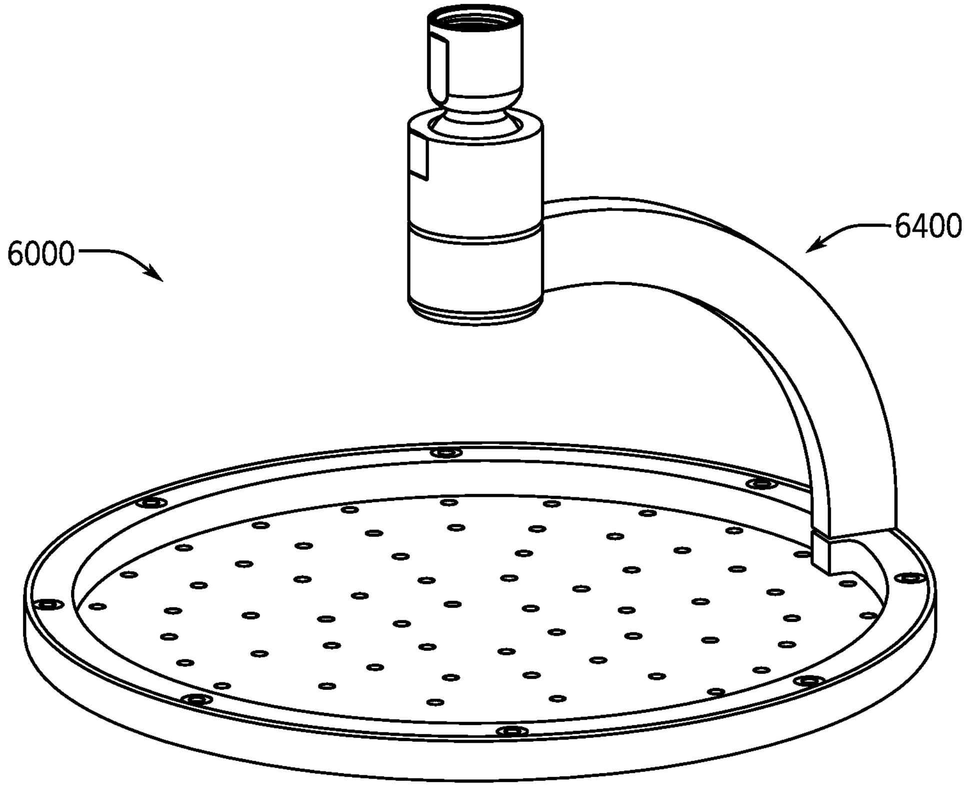
FIG. 18 is a top perspective view of a showerhead, according to another exemplary embodiment.

Yet another embodiment of a showerhead 5000 is shown in FIG. 17. The showerhead 5000 is configured to produce a distributed fluid flow 32 in a rainfall pattern. The showerhead 5000 includes a support member 5400 that extends at an angle (i.e., an angle relative to a primary axis 22 of a fluid stream 20) between a flow device 5300 and a distribution plate 5500. More specifically, the support member 5400 extends from a central position above the distribution plate 5500 to a lip 5510 of the distribution plate 5500 proximate to an outer perimeter of the distribution plate 5500. A similar showerhead 6000 configuration is shown in FIG. 18, although with a curved support post 6400 rather than a support post that extends linearly between the flow device and the lip.

Figure 19:
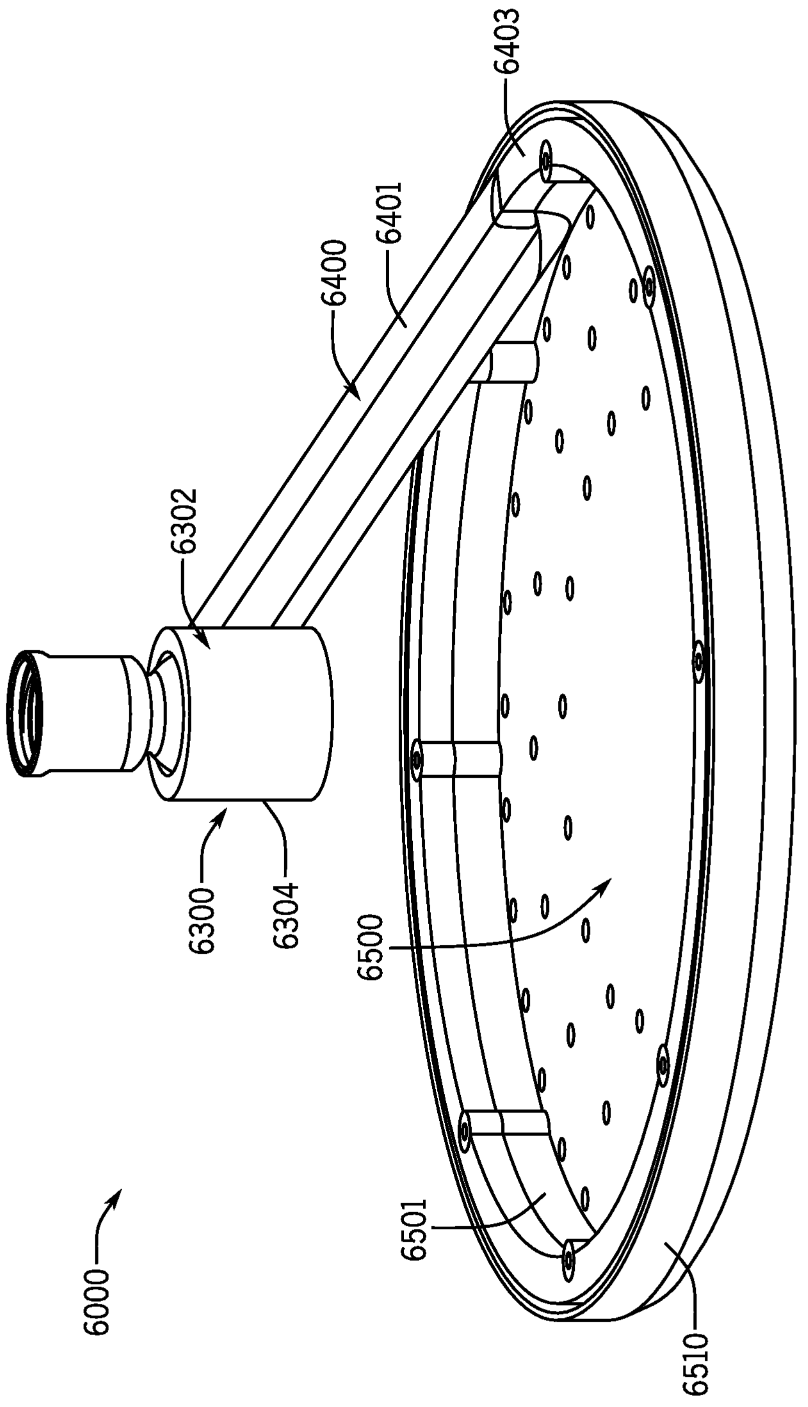
FIG. 19 is a top perspective view of a showerhead, according to another exemplary embodiment.
Figure 20:
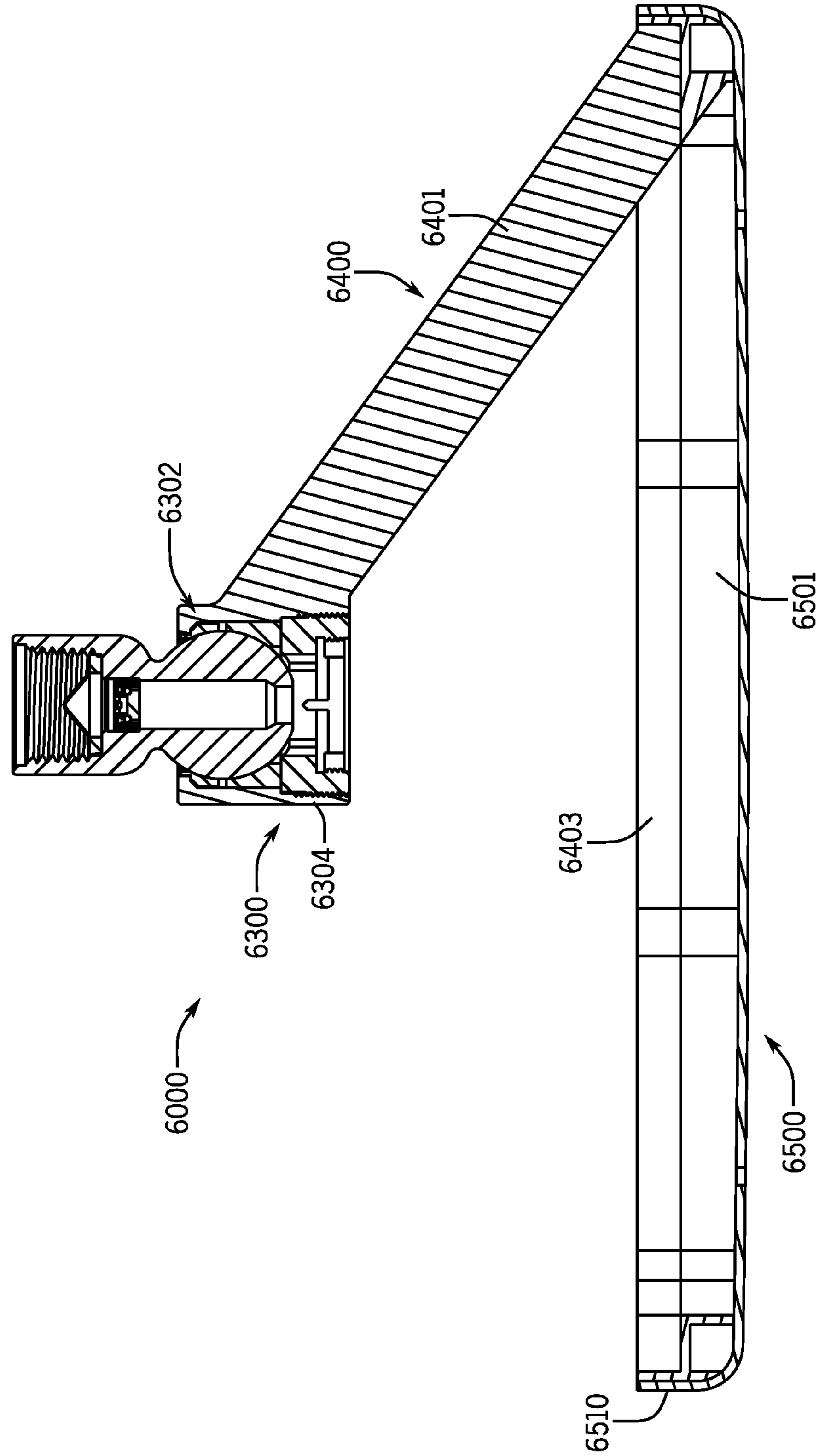
FIG. 20 is a side cross-sectional view of the showerhead of FIG. 19.
Figure 21:
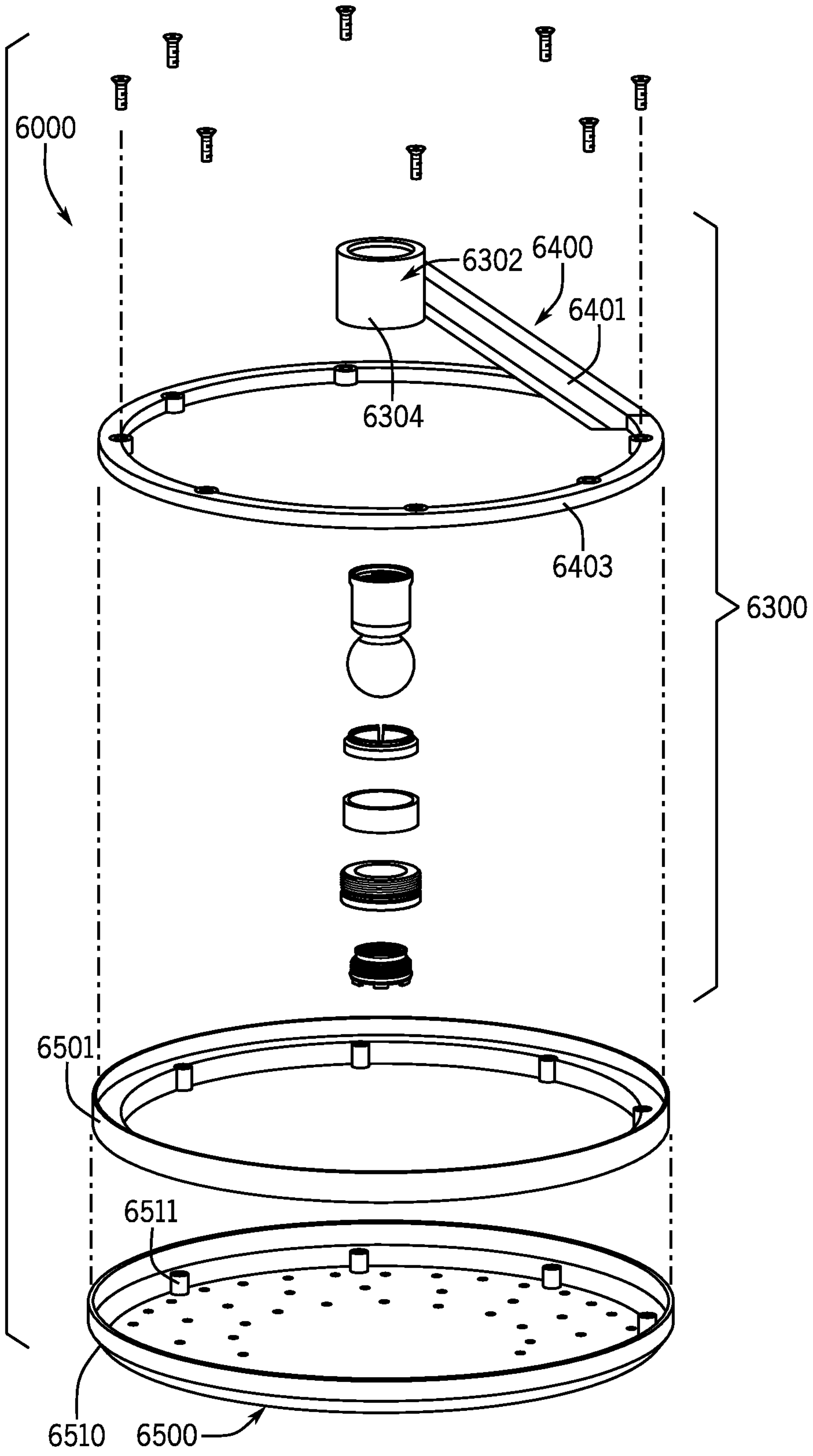
FIG. 21 is an exploded view of the showerhead of FIG. 19.

Referring to FIGS. 19-20, a showerhead 6000 is shown to include a support post 6400 that is integrally formed with a body 6302 of a flow device 6300. In particular, the support post 6400 is integrally formed with an outer body portion 6304 of the body 6302. The support post 6400 includes an angled body portion 6401 a retaining ring 6403 that is welded to a lower end of the angled body portion 6401. In other embodiments, the retaining ring 6403 may be secured to the angled body portion 6401 via a fastener or integrally formed with the angled body portion 6401 as a single unitary structure. The retaining ring 6403 is disposed along a perimeter of a distribution plate 6500 of the showerhead 6000, inboard of a lip 6510 of the distribution plate 6500. As shown in FIGS. 19-20, the support post 6400 is coupled to a distribution plate 6500 via an intermediate ring 6501, which is "sandwiched" or otherwise disposed between the retaining ring 6403 and an upper surface of the distribution plate 6500. As shown in FIG. 21, the distribution plate further includes a plurality of internally threaded posts 6511 that extend upwardly from the upper surface in substantially perpendicular orientation relative to the upper surface. Both the retaining ring 6403 and the intermediate ring 6501 are secured in position with respect to the distribution plate 6500 by a plurality of fasteners (e.g., screws, bolts, etc.) that engage with the posts 6511 on the distribution plate 6500.

Figure 23:
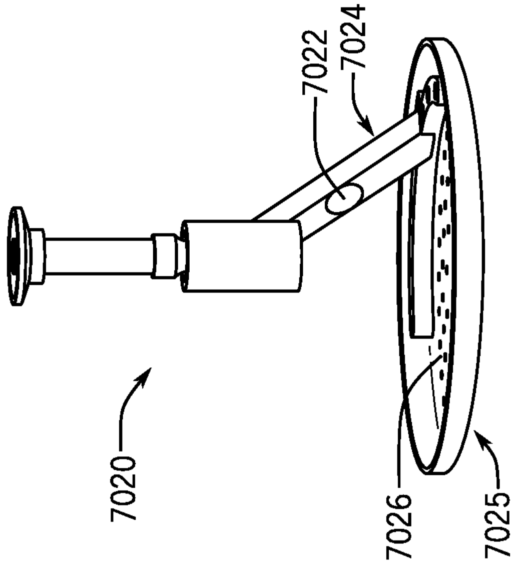
FIG. 23 is a top perspective view of a showerhead, according to another exemplary embodiment.
Figure 25:
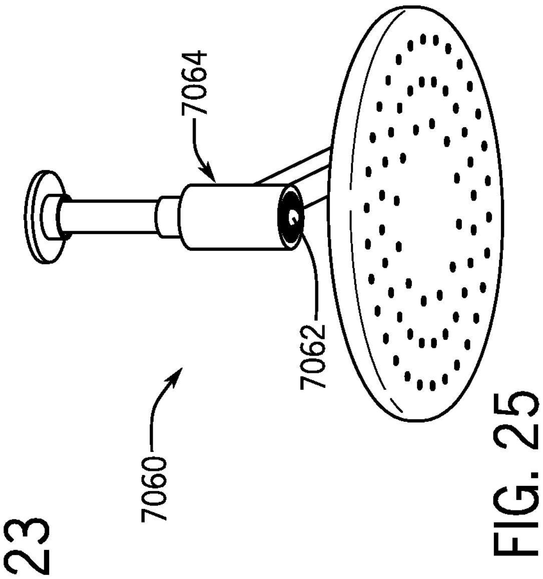
FIG. 25 is a bottom perspective view of a showerhead, according to another exemplary embodiment.
Figure 22:
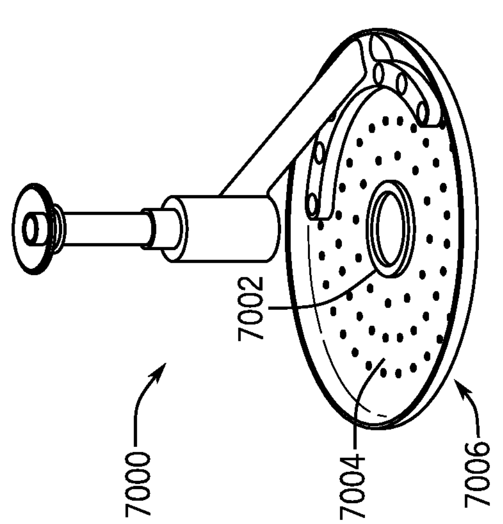
FIG. 22 is a top perspective view of a showerhead, according to another exemplary embodiment.
Figure 24:
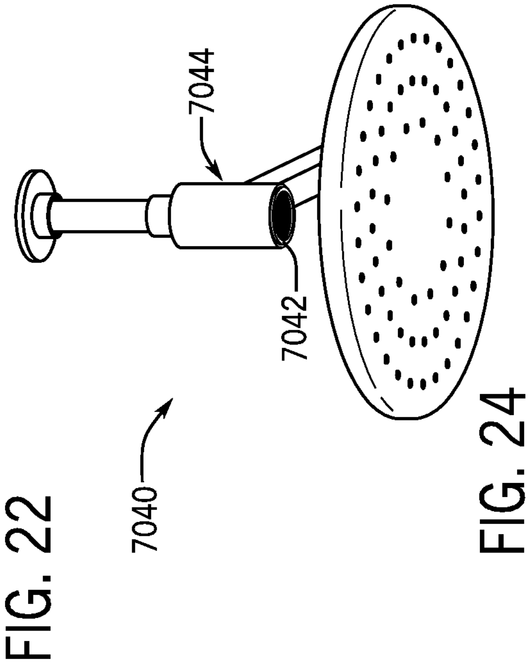
FIG. 24 is a bottom perspective view of a showerhead, according to another exemplary embodiment.

In some embodiments, the showerhead may include lighting elements to improve the overall aesthetic of the showerhead. The lighting elements may be configured to project onto the surface of the water above the distribution plate and to reflect off the distribution plate and onto a ceiling above the showerhead or to other walls of a shower enclosure. Referring to FIGS. 22-25, different lighting concepts for a showerhead are shown, according to various exemplary embodiments. FIG. 22 shows a showerhead 7000 that includes a lighting element 7002 on an upper surface 7004 of a distribution plate 7006 for the showerhead 7000. The lighting element 7002 is a ring that is configured to be at least partially submersed in water. FIG. 23 shows a showerhead 7020 that includes a lighting element 7022 on a lower angled surface of a support post 7024 of the showerhead 7020. The lighting element 7022 of FIG. 23 is arranged to direct light downward onto a surface of the fluid volume retained within a cup-shaped distribution plate 7025. An upper surface 7026 of the distribution plate 7025 may include a reflective material such as chrome to redirect light toward a ceiling above the showerhead and thereby provide a relaxing aesthetic for an occupant of the shower. FIG. 24 shows a showerhead 7040 that includes a lighting element 7042 disposed on a lower surface of a flow device 7044 of the showerhead 7040. The lighting element 7042 is in a ring shape and extends along a perimeter of the lower surface around the laminar flow stream to direct into the laminar flow stream and downward onto the water/distribution plate. FIG. 25 shows a showerhead 7060 that includes a lighting element 7062 disposed centrally on a lower surface of a flow device 7064 of the showerhead 7060. During operation, fluid flowing out through the lower surface surrounds the lighting element 7042, which may further enhance the overall aesthetic (due to light penetrating radially outwardly through the laminar flow stream. In any of the above embodiments, the lighting element 7062 may include a light emitting diode (LED) or another compact or low profile light source.

Figure 27:
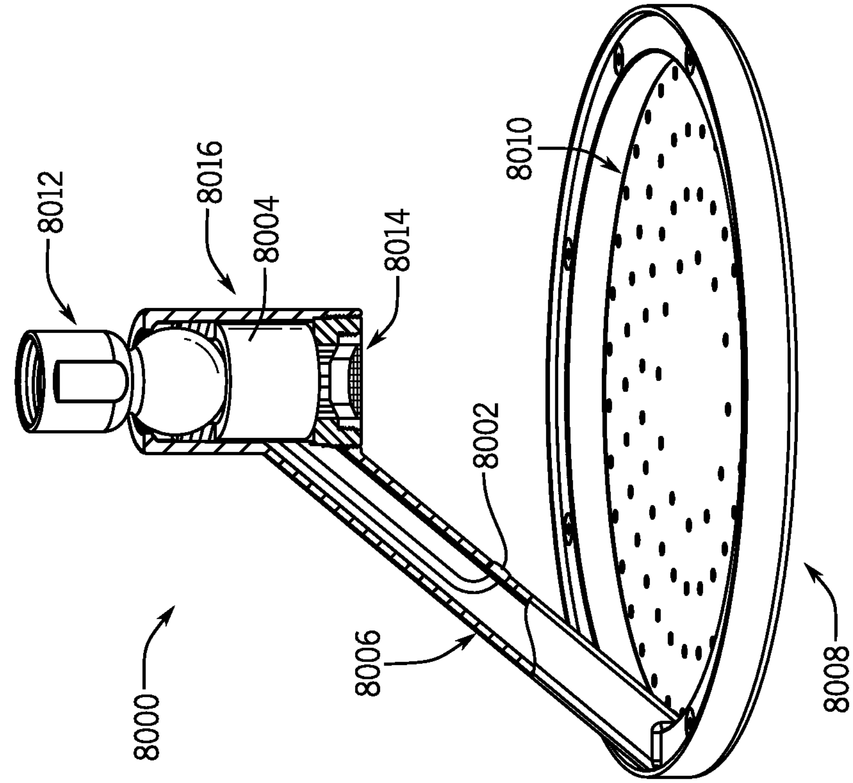
FIG. 27 is a perspective cross-sectional view of a showerhead, according to another exemplary embodiment.
Figure 26:
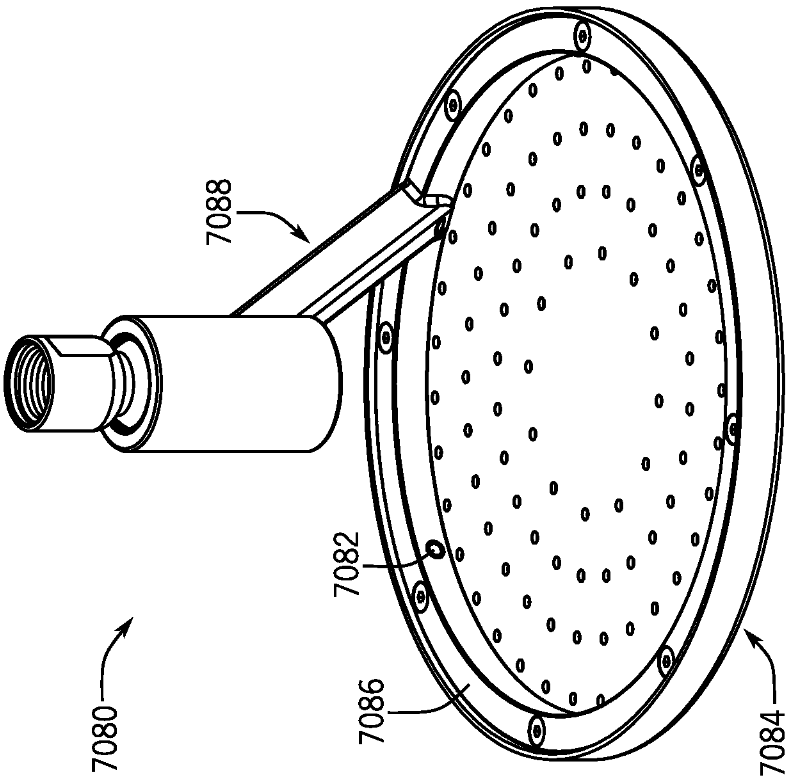
FIG. 26 is a top perspective view of a showerhead, according to another exemplary embodiment.

FIG. 26 shows a showerhead 7080 that includes lighting elements 7082 disposed along an outer perimeter of a distribution plate 7084. The lighting elements 7082 direct light inwardly (e.g., radially inwardly) toward a central axis of the distribution plate 7084. The lighting elements 7082 are coupled to a retaining ring 7086 of a support post 7088 for the showerhead 7080 and are configured to be at least partially submerged beneath a volume of water that is contained within a hollow cavity of the cup-shaped distribution plate 7084. In some embodiments, the lighting elements may be electrically coupled to hydrogenerator built into the showerhead 7080 or another standalone power source built into the showerhead 7080. In other embodiments, the lighting elements may be powered via another suitable power source (e.g., batteries, AC power, etc.). For example, FIG. 27 shows a showerhead 8000 that includes a lighting element 8002 and a power source 8004 electrically coupled to the lighting element 8002. The lighting element 8002 is coupled to an angled lower surface of a support post 8006 of the showerhead 8000 so as to direct light downwardly at an angle toward an upper surface of a distribution plate 8008. The lighting element 8002 is electrically coupled to the power source 8004 via wires that extend at least partially through a hollow portion 8010 of the support post 8006.

As shown in FIG. 27, the power source 8004 is coupled to an upper end of the support post 8006. In particular, the power source 8004 is "sandwiched" or otherwise disposed between a showerhead connector 8012 and the inner body portion 8014 of a flow device 8016. According to various exemplary embodiments, the power source 8004 is a water-driven turbine that generates power in proportion to a flow rate of water through the flow device 8016 (e.g., a flow of water passing through the showerhead 8000). As such, the turbine may be configured to power the lighting element 8002 whenever water is provided to the showerhead 8000 and at an intensity that is proportional to the flow rate of water. In other embodiments, the lighting element 8002 may be configured such that the intensity of light is approximately constant regardless of the flow rate. In some embodiments, the showerhead may include a switch to enable or disable the lighting element 8002 based on user preferences. In yet other embodiments, the showerhead 8000 may include a power storage device (e.g., a battery) that may be used to power the lighting element 8002 for a period of time when the flow of water to the showerhead 8000 is terminated.

The showerhead, of which various exemplary embodiments are disclosed herein, provides several advantages over conventional showerhead fixtures. Among other benefits, the showerhead produces a fluid stream 20 and a distributed fluid flow 30, 32, both of which are visible to a user or occupant of a shower. These flow arrangements can, advantageously, provide for a more relaxing shower experience and a more pleasing aesthetic to a user or occupant of the shower. In addition, the showerheads disclosed herein have a more efficient structural design that can help to limit water flow restrictions and the accumulation of bacteria. In some embodiments, the showerhead may include a lighting element and standalone power source to illuminate different portions of the showerhead during operation to thereby provide a relaxing aesthetic to an occupant of the shower.

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

The terms “coupled,” “connected,” and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A showerhead, comprising:

a flow device including a flow regulator; and a flow distribution member coupled to the flow device and spaced apart from the flow device by a region that is open to an atmosphere surrounding the showerhead, the flow distribution member comprising a base having a substantially planar surface that faces an outlet of the flow device, the base arranged to contain water that is received from the flow device, the base defining a plurality of perforations, the flow regulator configured to meter the flow of water provided to the flow distribution member to produce a first fluid flow over a first coverage area that is circumscribed by the base.

2. The showerhead of claim 1, further comprising a showerhead connector pivotably coupled to the flow device by a ball joint and configured to fluidly couple the showerhead to a water source within a shower enclosure.

3. The showerhead of claim 1, further comprising a support member, wherein a first end of the support member is coupled to the flow device, and wherein a second end of the support member is coupled to the flow distribution member, and wherein a fluid stream between the flow device and the flow distribution member is visible to a user during operation of the showerhead.

4. The showerhead of claim 2, wherein the flow distribution member is rotatable about an axis of the showerhead connector without altering an axial position of the flow distribution member.

5. The showerhead of claim 1, wherein the flow device is configured to produce a second fluid flow over a second coverage area, the first coverage area being larger than the second coverage area.

6. The showerhead of claim 1, wherein the flow distribution member further comprises a lip disposed along a perimeter of the base, and wherein together the base and the lip define a hollow cavity forming a cup-shape.

7. The showerhead of claim 6, wherein the lip extends downwardly from the base away from the flow device in a substantially perpendicular orientation relative to the base.

8. The showerhead of claim 6, wherein the lip extends upwardly from the base toward the flow device in a substantially perpendicular orientation relative to the base.

9. A showerhead, comprising:

a flow device including a flow regulator;

a flow distribution member coupled to the flow device and spaced apart from the flow device by a region that is open to an atmosphere surrounding the showerhead, the flow distribution member comprising:

a base having a substantially planar surface that faces an outlet of the flow device, with the flow distribution member defining a lip extending along a perimeter edge of the base, the base arranged to contain water that is received from the flow device; and a retaining ring disposed along a perimeter of the base and inboard from the lip; and a support post coupled to the flow device and the retaining ring, the support post extending at an angle between the flow device and the retaining ring.

10. The showerhead of claim 1, wherein the flow distribution member is a flow distribution plate that is configured to be positioned beneath the flow device during operation.

11. The showerhead of claim 1, further comprising a support post engaged with and extending between the flow device and the flow distribution member, the flow distribution member suspended away from the flow device by the support post.

12. A showerhead, comprising:

a flow device including a flow regulator;

a support post coupled to the flow device and extending at least partially axially away from the flow device; and a flow distribution member suspended away from the flow device by the support post so as to define a space between the flow device and the flow distribution member that is open to an atmosphere surrounding the showerhead, the flow distribution member configured to receive a fluid from the flow device and to allow the fluid to flow therethrough, the flow regulator configured to meter the flow of water provided to the flow distribution member to produce a first fluid flow over a first coverage area that is circumscribed by the base.

13. The showerhead of claim 12, wherein the flow distribution member comprises a lip disposed along a perimeter thereof so that the flow distribution member defines a hollow cavity forming a cup shape.

14. The showerhead of claim 13, wherein the flow distribution member further comprises a retaining ring disposed along a perimeter thereof and inboard from the lip, the support post coupled to the retaining ring, the support post extending at an angle between the flow device and the retaining ring.

* * * * *